United States Patent
Lee et al.

(10) Patent No.: US 8,019,175 B2
(45) Date of Patent: Sep. 13, 2011

(54) REGION-OF-INTEREST PROCESSING FOR VIDEO TELEPHONY

(75) Inventors: Yen-Chi Lee, San Diego, CA (US); Khaled Helmi El-Maleh, San Diego, CA (US); Ming-Chang Tsai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1251 days.

(21) Appl. No.: 11/183,072

(22) Filed: Jul. 15, 2005

(65) Prior Publication Data
US 2006/0215753 A1    Sep. 28, 2006

Related U.S. Application Data

(60) Provisional application No. 60/660,200, filed on Mar. 9, 2005.

(51) Int. Cl.
*G06K 9/20* (2006.01)
*G06K 9/46* (2006.01)
*H04N 7/14* (2006.01)

(52) U.S. Cl. .......... 382/282; 382/239; 348/14.01; 348/14.02; 348/14.03; 348/14.04; 348/14.05; 348/14.08; 348/14.09; 348/14.1; 348/14.12; 348/14.13

(58) Field of Classification Search .......... 382/239, 382/282; 348/14.01–14.05, 14.08–14.1, 348/14.12, 14.13
See application file for complete search history.

(56) References Cited

U.S. PATENT DOCUMENTS

| | | | |
|---|---|---|---|
| 6,122,005 A | 9/2000 | Sasaki et al. | |
| 6,178,204 B1 | 1/2001 | Hazra | 375/240.25 |
| 6,368,277 B1 * | 4/2002 | Mao et al. | 600/441 |
| 6,614,465 B2 | 9/2003 | Alexander et al. | |
| 6,618,444 B1 | 9/2003 | Haskell et al. | |
| 6,643,387 B1 | 11/2003 | Sethuraman et al. | |
| 6,775,412 B1 | 8/2004 | Nister et al. | 382/243 |
| 7,020,697 B1 * | 3/2006 | Goodman et al. | 709/223 |
| 2002/0141498 A1 | 10/2002 | Martins et al. | |
| 2002/0172421 A1 | 11/2002 | Kondo et al. | 382/173 |
| 2003/0059096 A1 | 3/2003 | Dekel et al. | 382/131 |

(Continued)

FOREIGN PATENT DOCUMENTS

CN    1291315    4/2001

(Continued)

OTHER PUBLICATIONS

Augustine, Jacob, et al. "Region of Interest Editing of MPEG-2 Video Streams in the Compressed Domain" IEEE 2004; pp. 559-562.

(Continued)

*Primary Examiner* — Vu Le
*Assistant Examiner* — Soo Jin Park
(74) *Attorney, Agent, or Firm* — John G. Rickenbrode

(57) ABSTRACT

The disclosure is directed to techniques for region-of-interest (ROI) processing for video telephone (VT) applications. According to the disclosed techniques, a recipient device defines ROI information for video information transmitted by a sender device, i.e., far-end video information. The recipient device transmits the ROI information to the sender device. Using the ROI information transmitted by the recipient device, the sender device applies preferential encoding to an ROI within a video scene. In this manner, the recipient device is able to remotely control ROI encoding of far-end video information by the sender device.

54 Claims, 19 Drawing Sheets

U.S. PATENT DOCUMENTS

| | | | |
|---|---|---|---|
| 2004/0006575 A1* | 1/2004 | Visharam et al. | 707/104.1 |
| 2004/0091158 A1* | 5/2004 | Miled et al. | 382/236 |
| 2004/0257432 A1* | 12/2004 | Girish et al. | 348/14.08 |
| 2005/0008343 A1 | 1/2005 | Frohlich et al. | |
| 2005/0024487 A1* | 2/2005 | Chen | 348/14.13 |
| 2005/0237380 A1 | 10/2005 | Kakii et al. | |

FOREIGN PATENT DOCUMENTS

| | | |
|---|---|---|
| JP | 9130767 | 5/1997 |
| JP | 11164308 A * | 6/1999 |
| JP | 2004187023 | 7/2004 |
| JP | 2004208125 | 7/2004 |
| KR | 1020000023278 | 4/2000 |
| WO | 0060869 | 10/2000 |

OTHER PUBLICATIONS

International Search Report and Written Opinion—PCT/US2006/008457, International Search Authority—European Patent Office—Jun. 29, 2006.

* cited by examiner

REGION-OF-INTEREST PROCESSING FOR VIDEO TELEPHONY

RELATED APPLICATONS

This Application claims priority to U.S. Provisional Application Ser. No. 60/660,200, filed on Mar. 9, 2005 and related to United States Patent And Trademark application Ser. No. 11/182,432, filed on Jul. 15, 2005.

TECHNICAL FIELD

The disclosure relates to digital video encoding and decoding and, more particularly, techniques for processing region-of-interest (ROI) information for video telephony (VT) applications.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.263 standard, and the emerging ITU H.264 standard. These video encoding standards generally support improved transmission efficiency of video sequences by encoding data in a compressed manner.

Video telephony (VT) permits users to share video and audio information to support applications such as videoconferencing. Exemplary video telephony standards include those defined by the Session Initiated Protocol (SIP), the ITU H.323 standard, and the ITU H.324 standard. In a VT system, users may send and receive video information, only receive video information, or only send video information. A recipient generally views received video information in the form in which it is transmitted from a sender.

Preferential encoding of a selected portion of the video information has been proposed. For example, a sender may specify a region-of-interest (ROI) to be encoded with higher quality for transmission to a recipient. The sender may wish to emphasize the ROI to a remote recipient. A typical example of an ROI is a human face, although a sender may wish to focus attention on other objects within a video scene. With preferential encoding of the ROI, a recipient is able to view the ROI more clearly than non-ROI regions.

SUMMARY

The disclosure is directed to techniques for region-of-interest (ROI) processing for video telephony (VT). According to the disclosed techniques, a local recipient device defines ROI information for video encoded and transmitted by a remote sender device, i.e., far-end video. The local recipient device transmits the ROI information to the remote sender device. Using the ROI information transmitted by the recipient device, the sender device applies preferential encoding to an ROI within a video scene, such as higher quality encoding or error protection. In this manner, the recipient device is able to remotely control ROI encoding of far-end video encoded by the sender device.

In addition to receiving far-end video, a recipient may be equipped to send video, i.e., near-end video. Hence, devices participating in VT communication may act symmetrically as both a sender and a recipient of video information. Acting as a recipient, each device may define far-end ROI information for video encoded by the remote device as a sender. Also, acting as a sender, each device may define near-end ROI information for video information transmitted to the other device as a recipient. A sender or recipient device may be referred to as "ROI-aware" in the sense that it is capable of processing ROI information provided by another device so as to support remote control of ROI video encoding.

Far-end ROI information permits a recipient to control remote ROI encoding by a sender device to more clearly view objects or regions within a received video scene. Near-end ROI information permits a sender to control local ROI encoding to emphasize objects or regions within a transmitted video scene. Accordingly, preferential encoding of an ROI by a sender may be based on ROI information generated by a recipient or a sender. In addition, a recipient device may preferentially decode an ROI based on ROI information, e.g., by application of higher quality post-processing such as error concealment, deblocking or deringing techniques.

To facilitate ROI processing, the disclosure further contemplates techniques for ROI selection, ROI mapping, ROI extraction, ROI signaling, ROI tracking, and access authentication of recipient devices to permit remote control of ROI encoding by a sender device. ROI selection may rely on pre-defined ROI patterns, verbal or textual ROI descriptions, or ROI drawing by a user. ROI mapping involves translation of a selected ROI pattern into an ROI map, which may take the form of a macroblock (MB) map suitable for use by a video encoder.

ROI signaling may involve in-band or out-of-band signaling of ROI information from a recipient to a sender device. ROI tracking involves dynamic adjustment of the ROI map in response to ROI motion. Access authentication may involve granting of access rights and levels to recipient devices for purposes of remote ROI control, as well as resolution of ROI control conflicts between local and remote users, or multiple remote users.

ROI extraction may involve processing a user description of a region of interest (ROI) to generate information specifying the ROI based on the description. Near-end video can be encoded based on the information specifying the ROI to enhance image quality of the ROI relative to non-ROI areas of the near-end video. The user description may be textual, graphical, or speech-based. An extraction module applies appropriate processing to generated the ROI information from the user description. The extraction module may locally reside with a video communication device, or reside in a distinct intermediate server configured for ROI extraction.

In one embodiment, the disclosure provides a method comprising receiving information from a remote device specifying a region of interest (ROI) within near-end video encoded by a local device and received by the remote device, and encoding the near-end video based on the ROI to enhance image quality of the ROI relative to non-ROI areas of the video.

In another embodiment, the disclosure provides a video encoding device comprising a region of interest (ROI) engine that receives information from a remote video communication device specifying a region of interest (ROI) within near-end video transmitted to the remote device, and a video encoder that encodes the near-end video to enhance image quality of the ROI relative to non-ROI areas of the video.

In an additional embodiment, the disclosure provides a method comprising generating information specifying a region of interest (ROI) within far-end video transmitted by a remote device and received by a local device, and transmitting the information to the remote device for use in encoding the far-end video based on the ROI to enhance image quality of the ROI relative to non-ROI areas of the video.

In a further embodiment, the disclosure provides a video encoding device comprising a region of interest (ROI) engine that generates information specifying a region of interest (ROI) within far-end video received from a remote device, and a video encoder that encodes near-end video and transmits information specifying the ROI with the encoded near-end video for use by the remote device in encoding the far-end video based on the ROI to enhance image quality of the ROI relative to non-ROI areas of the far-end video.

In another embodiment, the disclosure provides a method comprising receiving from a user a description of a region of interest (ROI) within near-end video generated by a local device, generating information specifying the ROI based on the description, and encoding the near-end video based on the information specifying the ROI to enhance image quality of the ROI relative to non-ROI areas of the near-end video.

In an additional embodiment, the disclosure provides a video encoding device comprising a region of interest (ROI) engine that receives a description of a region of interest (ROI) within near-end video encoded by the device, and generates information specifying the ROI based on the description, and a video encoder that encodes the near-end video to enhance image quality of the ROI relative to non-ROI areas of the video.

In a further embodiment, the disclosure provides a video encoding system comprising a first video communication device that encodes near-end video, a second video communication device the receives the near-end video from the first video communication device, wherein the second video communication device generates a user description of a region of interest (ROI) within the near-end video generated by the first video communication device, and an intermediate server, structurally distinct from the first and second video communication devices, that generates information specifying the ROI based on the description, wherein the first video communication device encodes the near-end video based on the information specifying the ROI to enhance image quality of the ROI relative to non-ROI areas of the near-end video.

The techniques described herein may be implemented in hardware, software, firmware, or any combination thereof. If implemented in software, the techniques may be realized in part by a computer readable medium comprising program code containing instructions that, when executed, performs one or more of the methods described herein.

The details of one or more embodiments are set forth in the accompanying drawings and the description below. Other features, objects, and advantages will be apparent from the description and drawings, and from the claims.

DETAILED DESCRIPTION

Figure 1:
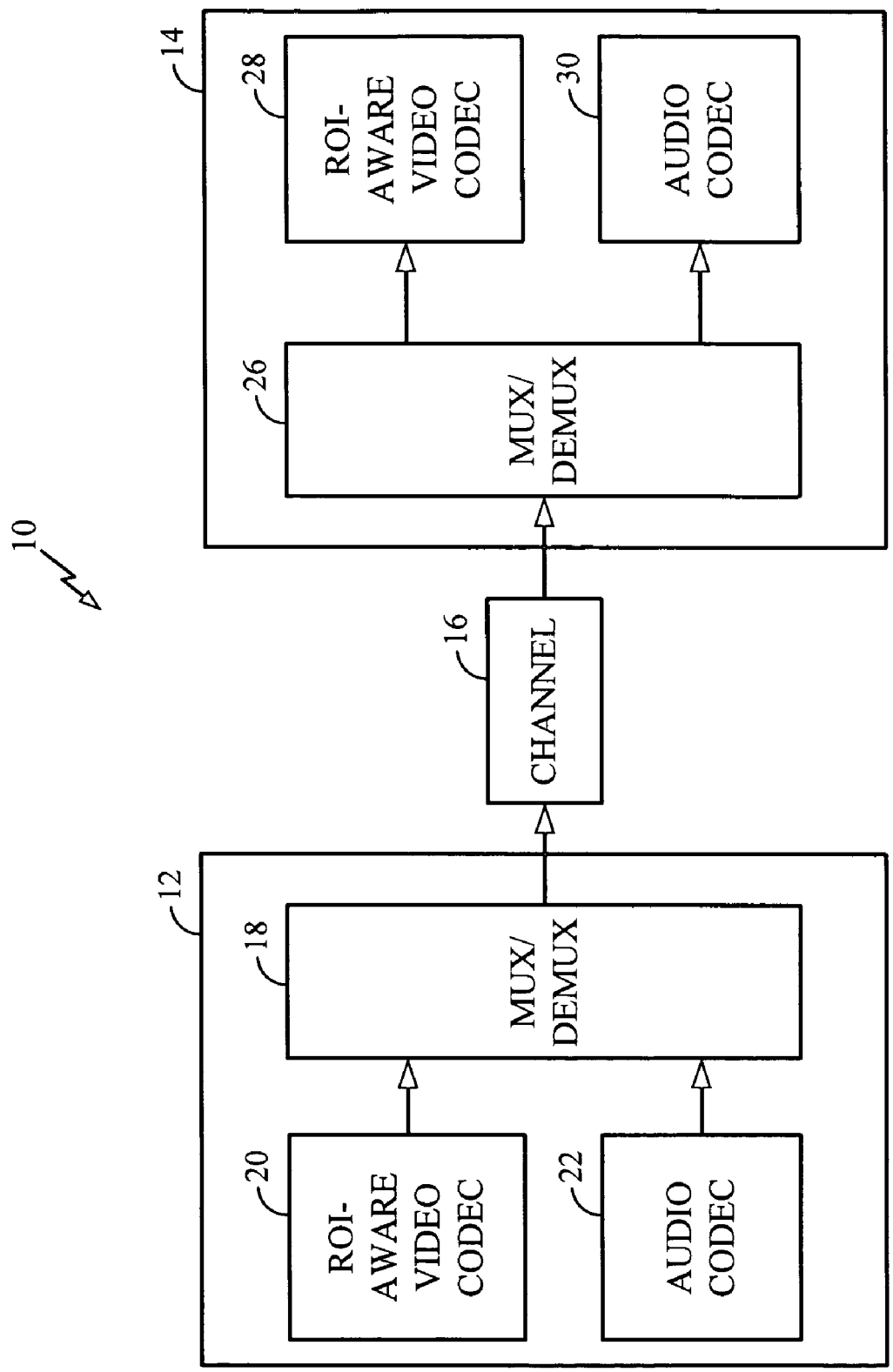
FIG. 1 is a block diagram illustrating a video encoding and decoding system incorporating ROI-aware video encoder-decoders (CODECs).

FIG. 1 is a block diagram illustrating a video encoding and decoding system 10 incorporating ROI-aware video encoder-decoders (CODECs). As shown in FIG. 1, system 10 includes a first video communication device 12 and a second video communication device 14. Communication devices 12, 14 are connected by a transmission channel 16. Transmission channel 16 may be a wired or wireless medium. System 10 supports two-way video transmission between video communication devices 12, 14 for video telephony. Devices 12, 14 may operate in a substantially symmetrical manner. In some embodiments, however, one or both video communication devices 12, 14 may be configured for only one-way communication to support ROI-aware video streaming.

For two-way applications, reciprocal encoding, decoding, multiplexing (MUX) and demultiplexing (DEMUX) components may be provided on opposite ends of channel 16. In the example of FIG. 1, video communication device 12 includes MUX/DEMUX component 18, ROI-aware video CODEC 20 and audio CODEC 22. Similarly, video communication device 14 includes MUX/DEMUX component 26, ROI-aware video CODEC 28 and audio CODEC 30. Each CODEC 20, 28 is "ROI-aware" in the sense that it is capable of processing ROI information provided remotely from another video communication device 12, 14, or locally from its own video communication device.

Video communication devices 12, 14 may be implemented as wireless mobile terminals or wired terminals equipped for video streaming, video telephony, or both. To that end, video communication devices 12, 14 may further include appropriate transmit, receive, modem, and processing electronics to support wireless communication. Examples of wireless mobile terminals include mobile radio telephones, mobile personal digital assistants (PDAs), mobile computers, or other mobile devices equipped with wireless communication capabilities and video encoding and/or decoding capabilities. Examples of wired terminals include desktop computers, video telephones, network appliances, set-top boxes, interactive televisions, or the like. Either video communication device 12, 14 may be configured to send video information, receive video information, or send and receive video information.

For video telephony applications, it is generally desirable that devices 12 support both video send and video receive capabilities. However, streaming video applications are also contemplated. In video telephony, and particularly mobile video telephony by wireless communication, bandwidth is a significant concern. Accordingly, selective allocation of additional encoding bits to an ROI, or other preferential encoding steps, can improve the image quality of a portion of the video while maintaining overall encoding efficiency. For preferential encoding, additional bits may be allocated to the ROI, while a reduced number of bits may be allocated to the non-ROI regions, such as the background in a video scene.

In general, system 10 employs techniques for region-of-interest (ROI) processing for video telephony (VT) applications. However, such techniques also may be applicable to video streaming applications, as mentioned above. For purposes of illustration, it will be assumed that each video communication device 12, 14 is capable of operating as both a sender and a recipient of video information, and thereby operating as a full participant in a VT session. For video information transmitted from video communication device 12 to video communication device 14, video communication device 12 is the sender device and video communication device 14 is the recipient device. Conversely, for video information transmitted from video communication device 14 to video communication device 12, video communication device 12 is the recipient device and video communication device 14 is the sender device. When discussing video information to be encoded and transmitted by a local video communication device 12, 14, the video information will be referred to as "near-end" video. When discussing video information to be encoded by and received from a remote video communication device 12, 14, the video information will be referred to as "far-end" video.

According to the disclosed techniques, when operating as a recipient device, video communication device 12 or 14 defines ROI information for far-end video information that is received from a sender device. Again, video information that is received from a sender device is referred to as "far-end" video information in the sense that it is received from the other (sender) device at the far end of the communication channel. Likewise, ROI information defined for video information that is received from a sender device is referred to as "far-end" ROI information. Far-end ROI generally refers to a region within the far-end video that most interests a receiver of the far-end video. The recipient device decodes the far-end video information and presents the decoded far-end video to a user via a display device. The user selects an ROI within a video scene presented by the far-end video.

The recipient device generates far-end ROI information based on the ROI selected by the user, and sends the far-end ROI information to the sender device. The far-end ROI information may take the form of an ROI macroblock (MB) map defining the ROI in terms of the macroblocks that reside within the ROI. The ROI MB map may flag MBs that are within the ROI with a 1, and MBs outside the ROI with a 0, to readily identify MBs included in (1) and excluded from (0) the ROI. An MB is a video block that forms part of a frame. The size of the MB may be 16 by 16 pixels. However, other MB sizes are possible. Accordingly, a MB may refer to any video block, including but not limited to a macroblock as defined within a particular video coding standard such as MPEG-1, MPEG-2 and MPEG-4, ITU H.263, ITU H.264, or any other standard.

Using the far-end ROI information transmitted by the recipient device, the sender device applies preferential encoding to a corresponding ROI within the video scene. In particular, additional encoding bits may be allocated to the ROI, while a reduced amount of encoding bits may be allocated to non-ROI regions, thereby improving image quality of the ROI. In this manner, the recipient device is able to remotely control ROI encoding of far-end video information by the sender device. The preferential encoding applies higher quality encoding to the ROI area than to non-ROI areas of the video scene, e.g., by preferential bit allocation or preferential quantization in the ROI area. The preferentially encoded ROI permits the user of the recipient device to view an object or region more clearly. For example, the user of the recipient device may wish to view a face or some other object more clearly than background regions of a video scene.

When operating as a sender device, video communication device 12 or 14 may also define ROI information for video information that is transmitted by the sender device. Again, video information that is generated in the sender device is referred to as "near-end" video in the sense that it is generated at the near end of the communication channel. ROI information generated by the sender device is referred to as "near-end" ROI information. Near-end ROI generally refers to a region of the near-end video that a sender wants to emphasize to a receiver. Hence, an ROI may be specified by a recipient device user as far-end ROI information, or by a sender device user as near-end ROI information. The sender device presents the near-end video to a user via a display device. The user associated with the sender device selects an ROI within a video scene presented by the near-end video. The sender device encodes the near-end video using the user-selected ROI such that the ROI in the near-end video is preferentially encoded, e.g., with higher quality encoding, relative to non-ROI areas.

The near-end ROI selected by a local user at the sender device allows a user of the sender device to emphasize regions or objects within the video scene, and thereby direct such regions or objects to the attention of the recipient device user. Notably, the near-end ROI selected by the sender device user need not be transmitted to the recipient device. Instead, the sender device uses the selected near-end ROI information to locally encode the near-end video before it is transmitted to the recipient device. In some embodiments, however, the sender device may send ROI information to the recipient device to permit application of preferential decoding techniques, such as higher quality error correction like error concealment or post-processing like deblocking and deringing filters.

If ROI information is provided by both the sender device and the recipient device, the sender device applies the received far-end ROI information from the recipient device or the locally generated near-end ROI information to encode the near-end video. ROI conflicts may arise between the near-end and far-end ROI selections provided by the sender device and recipient device. Such conflicts may require resolution, such as active resolution by a local user or resolution according to specified access rights and levels, as will be described elsewhere in this disclosure. In either case, the sender device preferentially encodes the ROI based on near-end ROI information provided locally by the sender device or remotely by the recipient device.

To facilitate ROI processing, the disclosure further contemplates techniques for ROI selection, ROI mapping, ROI signaling, ROI tracking, and access authentication of recipient devices to permit remote control of ROI encoding by a sender device. As will be described, different ROI selection techniques applied by a recipient device or sender device may involve selection of pre-defined ROI patterns, verbal or textual ROI description, or ROI drawing by a user. In a recipient device, ROI mapping involves translation of a selected far-end or near-end ROI pattern into an ROI map, which may take the form of a macroblock (MB) map. ROI signaling may involve in-band or out-of-band signaling of far-end ROI information from a recipient device to a sender device. ROI tracking involves dynamic adjustment of the far-end ROI map generated by the recipient device, or the local near-end ROI generated by the sender itself, in response to ROI motion. Access authentication may involve granting of access rights and levels to recipient devices for purposes of remote far-end ROI control, as well as resolution of ROI control conflicts between recipient and sender devices.

System 10 may support video telephony according to the Session Initiated Protocol (SIP), ITU H.323 standard, ITU H.324 standard, or other standards. Each video CODEC 20, 28 generates encoded video data according to a video compression standard, such as MPEG-2, MPEG-4, ITU H.263, or ITU H.264. As further shown in FIG. 1, video CODECs 20, 28 may be integrated with respective audio CODECs 22, 30, and include appropriate MUX/DEMUX components 18, 26 to handle audio and video portions of a data stream. The MUX-DEMUX units 18, 26 may conform to the ITU H.223 multiplexer protocol, or other protocols such as the user datagram protocol (UDP).

Figure 2:
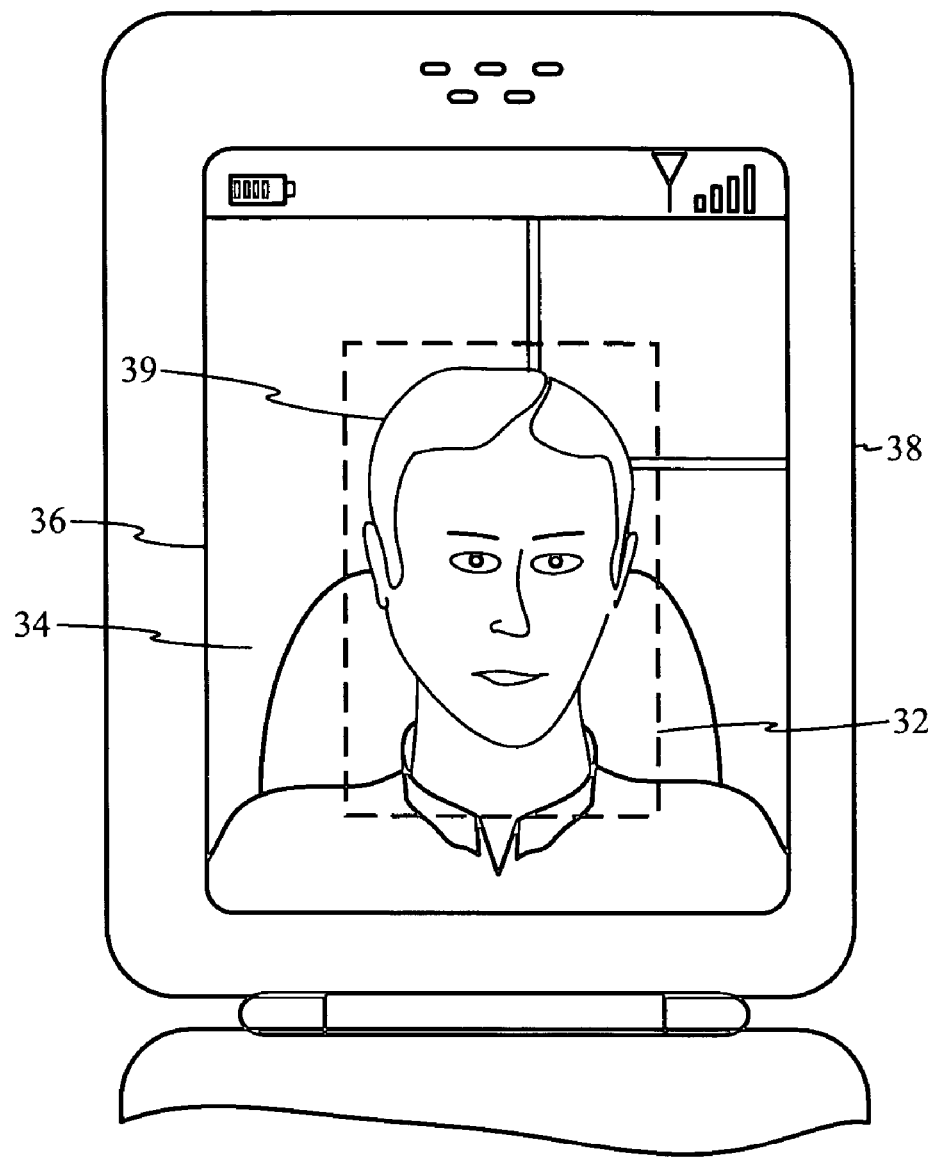
FIG. 2 is a diagram illustrating definition of an ROI within a video scene presented on a display associated with a wireless communication device.

FIG. 2 is a diagram illustrating definition of an ROI 32 within a video scene 34 presented on a display 36 associated with a wireless communication device 38. In the example of FIG. 2, ROI 32 is a rectangular region that contains the face 39 of a person presented in video scene 34, although the ROI could contain any image or object for which improved or enhanced encoding is desired. In VT applications, the person presented in video scene 34 typically will be a user of a remote sender device who is party to a videoconference with a user of wireless communication device 38, operating as recipient device. ROI 32 constitutes a far-end ROI in that it defines an ROI in a video scene transmitted from a remote sender device. In accordance with this disclosure, the far-end ROI 32 is transmitted to the sender device to specify preferential encoding of the areas of the video scene within the ROI. In this manner, the local user of the recipient device 38 is able to remotely control the image quality of far-end ROI 32. As will be described, the size, shape and position of far-end ROI 32 may be fixed or adjustable, and may be defined, described or adjusted in a variety of ways.

ROI 32 permits the recipient device user to more clearly view individual objects within video scene 34, such as the face 39 of a person. The face 39 within ROI 32 is encoded with higher image quality relative to non-ROI areas such as background regions of video scene 34. In this way, the user is able to more clearly view facial expressions, lip movement, eye movement, and the like. However, ROI 32 may alternatively be used to specify any objects other than the face. Generally speaking, the ROI in VT applications can be very subjective and may differ from user to user. The desired ROI also depends on how VT is used. In some cases, VT may be used to view and evaluate objects, in contrast to videoconferencing.

For example, a husband may use a VT application to show gifts that he wants to buy in a gift shop in an airport. The husband may like to get a second opinion from his wife in a timely and interactive way. By doing so, he can make decisions immediately as his flight is about to depart. In this case, the ROI is the region that covers the gifts that the husband is considering. By allowing the wife (or the husband) to select the ROI, it is possible to achieve better encoding or better quality of service for the particular ROI and thereby permit the wife to more clearly view the gifts.

As another example, two or more engineers may conduct a VT call involving presentation and discussion of various equations or diagrams on a whiteboard. In this case, a remote user may wish to view a section of the whiteboard with greater image quality, e.g., to more clearly see the details of an equation. To that end, the remote user selects an ROI that encompasses the equation. In addition, as an engineer adds to the whiteboard, the remote user may wish to move the ROI to track the subject matter that is newly added to the whiteboard. The ability of a remote user to specify the ROI may significantly improve the exchange of information in a technical discussion.

The ROI techniques described herein may not only improve the video quality of the ROI, but also improve the video interactions between two users. In general, conventional VT applications merely combine two one-way video transmissions and any interaction is done vocally. In conventional VT applications, there typically is no interaction on the video side. Allowing the recipient device user to have at least limited control over video content that is received from a sender device during a VT call permits increased video interaction.

In this manner, a VT application can be designed so that recipient device users can select an ROI, and send ROI information back to the sender device for preferential treatment of the ROI, such as higher quality encoding, e.g., with allocation of more encoding bits, or stronger error protection, e.g., intra-MB refreshment. In effect, by specifying far-end ROI, a recipient device user can remotely control the sender device encoder. In addition, this far-end ROI information can be used by the ROI-aware video decoder in the device that receives the far-end video for better post-processing, such as error concealment, deblocking or deringing. Remote control of the video encoder by a recipient of the encoded video is different from merely controlling the pan, tilt, zoom or focus of a remote camera. With remote ROI processing, in contrast, the user is able to influence the quality of encoding applied to a particular region or regions. In some embodiments, however, remote camera control can be provided in combination with remote video encoder control.

Figure 3:
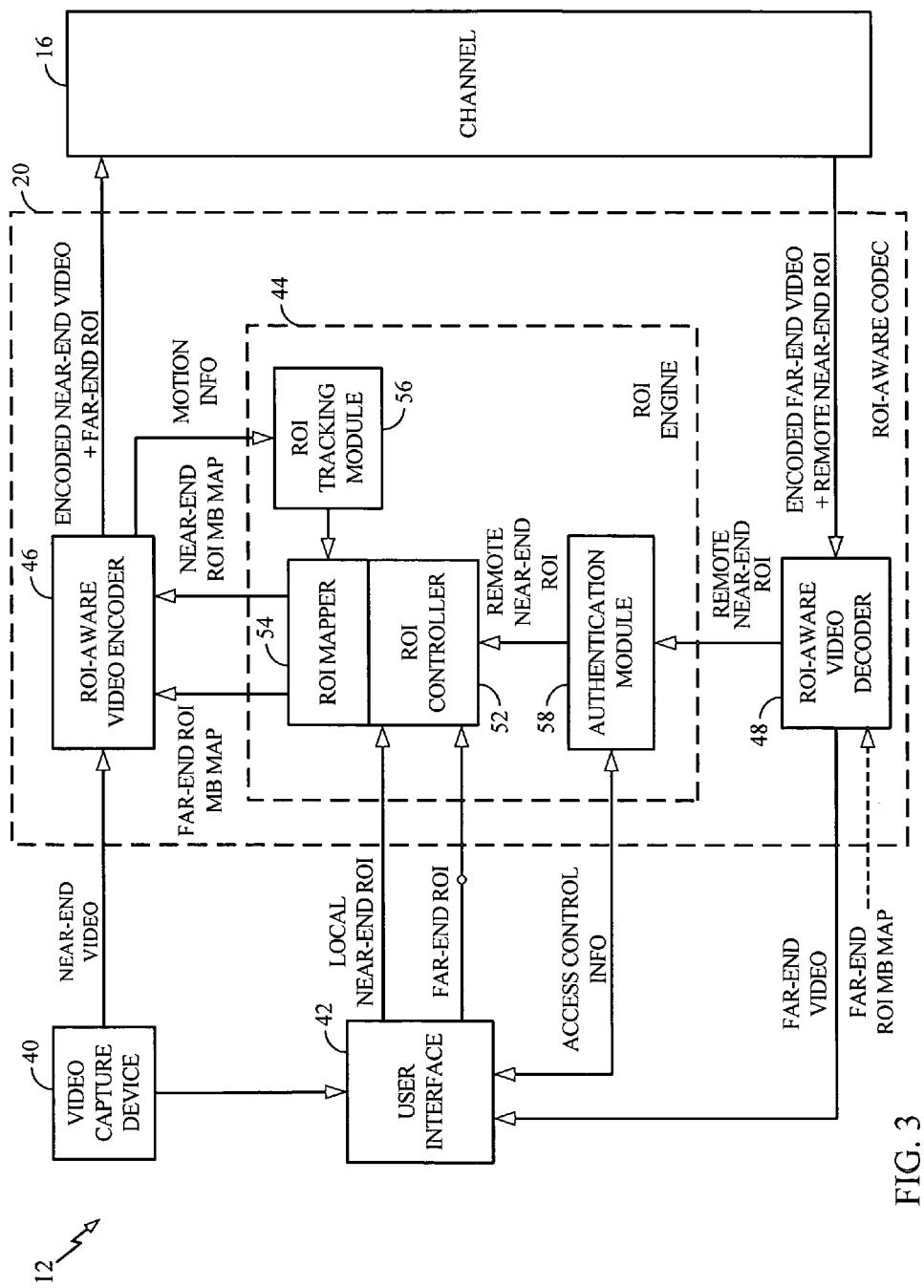
FIG. 3 is a block diagram illustrating a communication device incorporating an ROI-aware CODEC.

FIG. 3 is a block diagram illustrating a video communication device 12 incorporating an ROI-aware CODEC. Although FIG. 3 depicts video communication device 12 of FIG. 1, video communication device 14 may be similarly constructed. Again, video communication device 12 or 14 may function as a recipient device, sender device, and preferably both a recipient and sender device. As shown in FIG. 3, video communication device 12 includes an ROI-aware CODEC 20, a video capture device 40, and a user interface 42. Although channel 16 is shown in FIG. 3, MUX-DEMUX and audio components are omitted for ease of illustration.

Video capture device 40 may be a video camera integrated with, or operably coupled to, video communication device 12. In some embodiments, for example, video capture device 40 may be integrated with a mobile telephone to form a so-called video camera phone. In this manner, video capture device 40 may support mobile VT applications.

User interface 42 may include a display device, such as a liquid crystal display (LCD), a plasma screen, projector display, or any other display apparatus, which may be integrated with, or operably coupled to, video communication device 12. The display device presents video imagery to a user of video communication device 12. The video imagery may include near-end video obtained locally by video capture device 40, as well as far-end video transmitted remotely from a sender device. In addition, user interface 42 may include any of a variety of user input media, including hard keys, soft keys, various pointing devices, styli, and the like, for entry of information by a user of video communication device 12. In some embodiments, the display device and user input media of user interface 42 may be integrated with a mobile telephone. A user of video communication device 12 relies on user interface 42 to view far-end video and, optionally, near-end video. In addition, the user relies on user interface 42 to enter information for definition or selection of far-end ROI and, optionally, near-end ROI.

As further shown in FIG. 3, ROI-aware CODEC 20 includes ROI engine 44, ROI-aware video encoder 46, and ROI-aware video decoder 48. ROI-aware video encoder 46 encodes near-end video ("NEAR-END VIDEO") obtained from video capture device 40 for transmission to a remote recipient device. Again, the term "near-end" designates video that is generated locally within video communication device 12, in contrast to "far-end" video that is received from a remote video communication device, such as video communication device 14. In the example of FIG. 3, ROI-aware video encoder 46 uses near-end ROI information obtained from a remote receiver ("REMOTE NEAR-END ROI") to preferentially encode a near-end ROI. The remote receiver is a user associated with remote video communication device 14.

From the perspective of the remote user, the remote near-end ROI is remote far-end ROI when it is transmitted by remote device 14, and is referred to as remote near-end ROI from the perspective of the local user of device 12 when it is received. That is, the perspective of the device 12, 14, as a sender or recipient, determines whether the video and ROI is considered applicable to the near-end or far-end video. Again, a user of a local device 12 that remotely controls video encoding at a remote device 14 specifies far-end ROI. Yet, as the user of the remote device 14 receives the far-end ROI, it is considered remote near-end ROI as it pertains to near-end video being encoded by the local device 14. In general, for purposes of the labels used in this disclosure, perspective is important.

Optionally, ROI-aware video encoder 46 may use near-end ROI information obtained from a local user of video communication device 14 ("LOCAL NEAR-END ROI"). Local near-end ROI also may be referred to as sender-driven ROI, as it is generated by the sender of the encoded near-end video. Local near-end ROI information is used by local encoder 46 and is not typically sent to the other video communication device 14, unless a video decoder in the remote device 14 is designed to apply preferential decoding to the near-end ROI specified by the user of sender device 12. Remote near-end ROI also may be referred to as receiver-driven ROI, as it is generated by the remote receiver of the encoded near-end video. Remote near-end ROI permits a recipient of video generated by video communication device 12 to control ROI encoding by ROI-aware encoder 46, whereas local near-end ROI permits a sender of video generated by video communication device 12 to control ROI encoding by ROI-aware encoder 46. In some cases, remote and local ROI definitions may conflict, requiring conflict resolution, as will be described.

The local and remote near-end ROI information may be provided to ROI-aware encoder 46 as a near-end ROI macroblock (MB) map ("NEAR-END ROI MB MAP"). The near-end ROI MB map identifies the particular MB's that reside within either the receiver near-end ROI or the sender near-end ROI. ROI-aware encoder 46 preferentially encodes the ROI in the near-end video with higher quality encoding, stronger error protection, or both in order to improve the image quality of the ROI when viewed by the remote user, e.g., at remote video communication device 14. Better error protection for the ROI may be particularly desirable in wireless telephony applications. The resulting encoded near-end video ("ENCODED NEAR-END VIDEO") is then transmitted to the remote device 14.

As will be explained, ROI-aware video encoder 46 also transmits far-end ROI information ("FAR-END ROI") that has been generated by the local user of video communication device 12 for far-end video received from remote video communication device 14. The far-end ROI serves as a receiver-driven ROI for the video encoded by the remote video communication device 14. In effect, the far-end ROI information transmitted by video communication device 12 permits at least partial control of an encoder of far-end video generated by the remote video communication device 14, just as remote near-end ROI received by ROI-aware decoder 48 is used by video communication device 12 to control ROI-aware video encoder 46. In this manner, each video communication device 12, 14 is able to influence ROI encoding in far-end video generated by the other device.

The far-end ROI information transmitted by video communication device 12 may be transmitted as in-band or out-of-band signaling information. In the case of in-band signaling, the far-end ROI information may be embedded within the encoded near-end video bitstream that is transmitted to remote video communication device 14. In the MPEG4 bitstream format, for example, there is a field called "user_data" that can be used to embed information that describes the bitstream. The "user_data" field, or a similar field in other bitstream formats, may be used to embed far-end ROI information without violating bitstream compliance. Alternatively, the ROI information may be embedded within the video bitstream by so-called data hiding techniques, such as steganography.

ROI-aware video decoder 48 is configured to seek the ROI information in the user_data field or elsewhere within the incoming far-end video from the remote device. In the case of out-of-band signaling, a signaling protocol, such as ITU H.245 or SIP, may be used to convey far-end ROI information. In either case, the far-end ROI information may take the form of an ROI MB map or physical coordinates defining the position and/or size of the far-end ROI. Once decoder 48 receives the far-end video bitstream, it retrieves the ROI information based on the agreed-upon format with the remote sender device, and passes the ROI information to access authentication module 58 to obtain access permission for near-end ROI control before providing the remote near-end ROI to video encoder 56.

In addition to controlling a remote video encoder to preferentially encode an ROI in the far-end video, the far-end ROI information can be applied to a local video decoder to preferentially decode MBs within the ROI in the far-end video. For example, as further shown in FIG. 3, the same far-end ROI MB map generated by ROI mapper 54 for transmission to the remote encoder can be provided to ROI-aware video decoder 48. ROI-aware video decoder 48 uses the ROI MB map to preferentially decode MBs within the far-end video received from the remote video communication device 14. For example, ROI-aware video decoder 48 may apply better post-processing to ROI MBs than to non-ROI MBs. In addition, or alternatively, ROI-aware video decoder 48 may apply more robust error concealment techniques to ROI MBs than to non-ROI MBs. In this manner, ROI-aware video decoder 48 relies on far-end ROI information generated by a local user to preferentially decode an ROI portion of the incoming far-end video for enhanced image quality.

ROI-aware video decoder 48 receives incoming far-end video from the remote video communication device, e.g., video communication device 14 of FIG. 1. ROI-aware video decoder 48 decodes the far-end video and provides the decoded video to user interface 42 for presentation to the local user on the display device. In addition, as discussed above, ROI-aware video decoder 48 receives remote near-end ROI information ("REMOTE NEAR-END ROI") from the remote video communication device 14. The near-end ROI information received from by ROI-aware video decoder 48 is generated by the user of the remote video communication device 14 to specify an ROI in the video transmitted by video communication device 12. As mentioned above, the remote near-end ROI information received by ROI-aware video decoder 48 is used to remotely control ROI-aware video encoder 46 to preferentially encode the ROI in the near-end video generated by video communication device 12. The remote near-end ROI is transmitted by in-band or out-of-band signaling techniques, as discussed above.

With further reference to FIG. 3, ROI-aware video encoder 46 and ROI-aware video decoder 48 interact with an ROI engine 44. ROI engine 44 processes the local and remote near-end ROI information for encoding and transmission of the near-end video bitstream from video capture device 40. In addition, ROI engine 44 processes the far-end ROI information provided via user interface 42 for encoding and transmission to remote video communication device 14. ROI engine 44 includes ROI controller 52, ROI mapper 54, ROI tracking module 56, and authentication module 58. In some embodiments, ROI tracking module 56 and authentication module 58 may be optional.

ROI-aware video encoder 46, ROI-aware video decoder 48, ROI controller 52, ROI mapper 54, ROI tracking module 56 and authentication module 58 may be formed in a variety of ways, as discrete functional modules or as a monolithic module that encompasses the functionality ascribed to each module. In any event, the various components of ROI-aware CODEC 20, including ROI engine 44, video encoder 46 and video decoder 48, may be realized in hardware, software, firmware, or a combination thereof. For example, such components may operate as software processes executing on one or more microprocessors or digital signal processors (DSPs), one or more application specific integrated circuits (ASICs), one or more field programmable gate arrays (FPGAs), or other equivalent integrated or discrete logic circuitry. If implemented in software, the techniques may be realized in part by a computer readable medium comprising program code containing instructions that, when executed in a processor or DSP, performs one or more of the methods described herein.

In operation, a user of video communication device 12 chooses either the near-end video generated by video capture device 40 or the far-end video decoded by ROI-aware video decoder 48 for viewing on the display device associated with user interface 42. In some embodiments, picture-in-picture (PIP) functionality may permit the user to simultaneously view the near-end video and far-end video. To view the near-end or far-end video for purposes of ROI definition, the user may manipulate user interface 42 to invoke an ROI definition mode. By default, video communication device 12 may handle video encoding and decoding without ROI considerations. By entering the ROI definition mode, the user activates the ROI-aware encoding and decoding aspects of video communication device 12. Alternatively, ROI-aware encoding and decoding may be the default mode.

Upon presentation of the far-end video, the user indicates an ROI in the far-end video using any of a variety of techniques, which will be described in greater detail. The far-end ROI highlights, within the video scene, a region or object that is of interest to the user and for which higher image quality is desired. User interface 42 produces a far-end ROI indication based on user input. The ROI information may be processed further by ROI engine 44 to produce far-end ROI information for transmission to video communication device 14.

The user alternatively may select the near-end video obtained from video capture device 40 for ROI definition. Upon presentation of the near-end video, the user optionally may indicate an ROI in the near-end video using techniques similar or identical to those used for ROI indication in far-end video. The near-end ROI or far-end ROI may be specified initially at the outset of a VT call, or at any time during the course of a VT call. In some embodiments, the initial ROI may be updated by the local user or remote user, or updated automatically by ROI tracking module 56. If the ROI is updated automatically, there is no need for the user to continue to input the ROI information. Instead, the ROI will be maintained based on initial input by the user, until the user changes or discontinues the ROI.

User interface 42 produces a local near-end ROI indication based on the indication provided by the user. Like the far-end ROI, indication the near-end ROI indication may be further processed by ROI engine 44. The near-end ROI indication highlights, within the video scene, a region or objects that the user wishes to emphasize to the remote user, i.e., by increased image quality. The local user may select near-end ROI or far-end ROI by selecting pre-defined ROI patterns or drawing the ROI pattern via user interface 42. Drawing the ROI pattern may involve free-hand drawing with a stylus, or resizing or repositioning of a default ROI pattern.

In the example of FIG. 3, user interface 42 provides both the local near-end ROI indication, if provided, and the far-end ROI indication to ROI controller 52 within ROI engine 44. In addition, ROI controller 52 receives remote near-end ROI from ROI-aware video decoder 48 via authentication module 58. In particular, ROI-aware video decoder 48 detects the presence of remote near-end ROI information within the received far-end video stream, or via out-of-band signaling, and provides the remote near-end ROI information to authentication module 58. The local near-end ROI and far-end ROI indication may be expressed in terms of coordinates within a video frame of the respective near-end video or far-end video. The coordinates of the ROI may be x-y coordinates within a video frame. However, the x-y coordinates are processed to produce an ROI MB map for use by encoder 46 or decoder 48, as will be explained.

ROI controller 54 processes the local near-end ROI, remote near-end ROI and far-end ROI, and applies them to ROI mapper 54. ROI mapper 54 converts the respective ROI coordinates into macroblock (MB) maps. More particularly, ROI mapper 54 generates a far-end MB map that specifies MBs within the far-end video that correspond to the far-end ROI indicated by the local user. In addition, ROI mapper 54 generates a near-end ROI MB map that specifies MBs within the near-end video that correspond to either the local near-end ROI, the remote near-end ROI, or a combination of both.

For predefined ROI patterns, ROI mapping is straightforward. Each predefined ROI pattern may have a designated MB mapping that is also predefined. For ROI patterns that are drawn, repositioned or resized, however, ROI mapper 54 selects MB boundaries that most closely conform to the coordinates of the ROI pattern specified by the user. For example, if a specified ROI crosses through an MB, ROI mapper 54 places the ROI boundary either at the outer edge or inner edge of the pertinent MB. In other words, ROI mapper 54 may be configured to include in the ROI MB map only MBs that are entirely within the ROI, or also include MBs that are partially within the ROI. In either case, the ROI includes a set of full MBs that most closely approximate the specified ROI. Again, video encoder 46 or video decoder 48 operate at the MB level, and will generally require translation of the ROI to an MB map. By designating individual MBs as being either included in or excluded from the ROI, the ROI MB map permits definition of ROIs with irregular, or non-rectangular shapes.

ROI-aware video encoder 46 transmits the far-end ROI MB map within the encoded near-end video or by out-of-band signaling to remote video communication device 14. The near-end ROI MB map is not transmitted to remote video communication device 14. Instead, the near-end ROI MB map is used by ROI-aware video encoder 46 to preferentially encode the specified MBs in the near-end video with higher quality encoding or stronger error protection prior to transmission to remote video communication device 14. Hence, ROI-aware video encoder 46 transmits encoded-near end video with preferentially encoded ROI, as well as far-end ROI information, to remote video communication device 14.

ROI tracking module 56 tracks changes in the ROI regions of the near-end video. If the VT application resides within a mobile video communication device, for example, a user may move from time to time, resulting in a change in the position of the user relative to the previously specified ROI. In addition, even when the user position is steady, other objects within the ROI may move out of the ROI regions. For example, a boat on a lake may bob up and down or move side to side with wave motion. In order to avoid the need for the user to redefine the ROI when movement occurs, ROI tracking module 56 may be provided to automatically track objects within the ROI regions.

In the example of FIG. 3, ROI tracking module 56 receives motion information from the encoded near-end video produced by ROI-aware video encoder 46. The motion information may take the form of motion vectors for MBs within the encoded near-end video, permitting closed loop control of ROI MB map definition by ROI mapper 54. Based on the motion information, ROI tracking module 56 generates incremental position adjustments to the near-end ROI MB map and provides the adjustments to ROI mapper 54. The position adjustments may be in the form of changes in MB status as being included in or excluded from the ROI.

The status of an MB in the ROI MB map may be changed if the motion information indicates substantial movement of the ROI. Typically, status changes will occur for MBs at the ROI outer boundary. In response to the position adjustments, ROI mapper 54 shifts the ROI specified by the near-end ROI MB map so that the ROI position adapts to the motion within the encoded near-end video on a frame-by-frame basis. ROI tracking module 56 and ROI mapper 54 cooperate to automatically adjust the ROI position as motion is detected within the video scene. In this manner, ROI engine 44 adjusts the ROI to track moving objects within the ROI.

Authentication module 58 serves to resolve ROI rights of remote users, including rights of individual users and priority of rights among multiple users. When ROI-aware video decoder 48 receives remote near-end ROI from remote video communication device 14, it provides the remote near-end ROI to ROI engine 44. In some instances, however, the remote near-end ROI specified by the remote user may be in conflict with the local near-end ROI specified by the local user. For example, the local and remote users may specify overlapping ROIs or entirely different ROIs within a video scene. In this case, authentication module 58 may be provided to resolve the ROI conflict.

Authentication module 58, in some embodiments, may apply a so-called "master-slave" mechanism to coordinate which near-end ROI information (local or remote) should be used at a given time. In particular, before the sender receives the receiver-driven ROI information, the sender is the near-end ROI master and has control of its near-end ROI. In other words, before remote near-end ROI is received at video communication device 12, the local user has control of near-end ROI. The remote user is then the near-end ROI "slave" and does not have control of the near-end ROI unless the master, i.e., the local user, grants access rights to control near-end ROI.

Once the local user grants an access right to the remote user, the local user no longer controls its near-end ROI. Instead, the remote user associated with video communication device 14 gains control of the near-end ROI for near-end video generated by video communication device 12, and becomes the master of near-end ROI. The remote user may retain control until the local user explicitly revokes access privileges or otherwise denies access by the remote user, or the remote user discontinues ROI selection, in which case master ROI control may revert back to the local user.

Once ROI-aware video decoder 48 receives the encoded far-end video, if any, it retrieves the remote near-end ROI information from the video bitstream based on an agreed-upon format with the sender. Again, the near-end ROI information may be embedded in the encoded far-end video or sent by out-of-band signaling. In either case, ROI-aware video decoder 48 passes the remote near-end ROI to authentication module 58 to obtain access permission before the remote near-end ROI is sent to ROI-aware video encoder 46, via ROI controller 52 and ROI mapper 54. Authentication module 58 limits access rights to particular users so that the encoding process cannot be controlled by users without authorization by the local user.

Authentication module 58 may be configured to grant and manage access rights and levels among one or more remote users. For example, a local user may grant access rights to selected remote users. Consequently, the local user may permit some remote users to control near-end ROI and prohibit other remote users from controlling near-end ROI. Also, the local user may assign relative access levels, or priorities, to the remote users. In this manner, the local user may specify a hierarchy of access levels among remote users, so that some remote users may have priority over other remote users in controlling the near-end ROI in the event multiple remote users request ROI control at the same time. For example, multiple remote users may simultaneously request ROI control in the course of a multi-party video conference. In such cases, ROI control would typically be granted exclusively to one user, either the local user, or, if control is granted by the local user, to a selected one of the remote users.

In some embodiments, authentication module 58 also may be responsible for resource monitoring to determine if the local video communication device 12 has the capabilities to enable ROI-aware video processing. If the local device does not have sufficient processing resources to support remote ROI control at a given time, or to serve a particular type of ROI request, authentication module 58 revokes remote ROI control access rights or denies the ROI request. As an example, bandwidth limitations imposed by a communication channel, or local processing loads, may result in denial of remote ROI control. As a further example, such limitations may permit use of preconfigured ROI patterns, but not drawn or described ROI patterns. Authentication module 58 may notify the remote device of the ROI decision by embedding a status message in the outgoing, encoded near-end video to be sent to the remote device.

In addition, individual remote users may be granted different access levels to control the degree to which a remote user may control the near-end ROI. For example, a remote user may be limited to selection of a set of predefined ROI patterns, a particular ROI location or size, or specification of ROI only upon approval of the local user. Hence, authentication module 58 may automatically resolve remote user control of near-end ROI or negotiate active approval of near-end ROI control by the remote user by interaction with the local user. For example, when a remote user requests access to control near-end ROI, authentication module 58 may present a query to the local user via user interface 42 to request approval of remote user ROI control.

Authentication module 58 can track access levels for remote users in any of a variety of ways. As mentioned above, the local user may actively approve a request to control near-end ROI from a remote user, and actively control access levels granted to the remote user. Alternatively, the local user may maintain an address book within memory in video communication device 12 that stores information associated with remote users, including access rights or levels. The address book may take the form of a database with a list of remote users and associated access levels. When a remote user requests near-end ROI control, authentication module 58 retrieves the pertinent access right information from the address book and applies the authentication process on an automated basis to resolve ROI control between the local user, the remote users, and possibly several remote users. If the remote user is not listed in the address book, the local user may elect to add the remote user to the address book with applicable access rights.

In some cases, the local user may override the default access levels specified for particular remote users in the address book. For example, authentication module 58 may permit the local user to actively rearrange ROI control priorities among different remote users during the course of a VT call or intervene to regain control of the near-end ROI exclusively as the local user. The interaction between the local user and authentication module 58 in maintaining an address book or actively managing ROI control requests is represented by ACCESS CONTROL INFO in FIG. 3.

Upon automated or active approval of near-end ROI control for a remote user, authentication module 58 passes the remote near-end ROI to ROI controller 52 for processing and mapping by ROI mapper 54. Alternatively, ROI controller 52 processes the local near-end ROI provided by the local user via user interface 42, i.e., if no remote near-end ROI is provided or the local user has chosen to control near-end ROI to the exclusion of remote users.

Authentication module 58 serves to resolve ROI conflicts between local and remote users. By default, authentication module 58 applies a master-slave concept by which the local user has near-end ROI control. Upon granting an access right with the highest level to the remote user, the remote user takes full control of the near-end ROI selection fro the ROI-aware video encoder 46 of video communication device 12. Otherwise, the local user has near-end ROI control that overrides any near-end ROI selections made by the remote user.

Even though the remote user may be granted access rights, the local user will prevail in near-end ROI control because the access rights of the remote user are ordinarily at a lower level than those of the local user. Hence, if the local user chooses to specify a near-end ROI, any near-end ROI selection made by the remote user will be disregarded. On the other hand, if the local user does not specify a near-end ROI, the level of access rights assigned to the remote user is effective, and the remote user is able to control near-end ROI. Nevertheless, as mentioned above, the local user still may choose to override the default master-slave relationship and give away the highest level of access rights to the local user.

Figure 4:
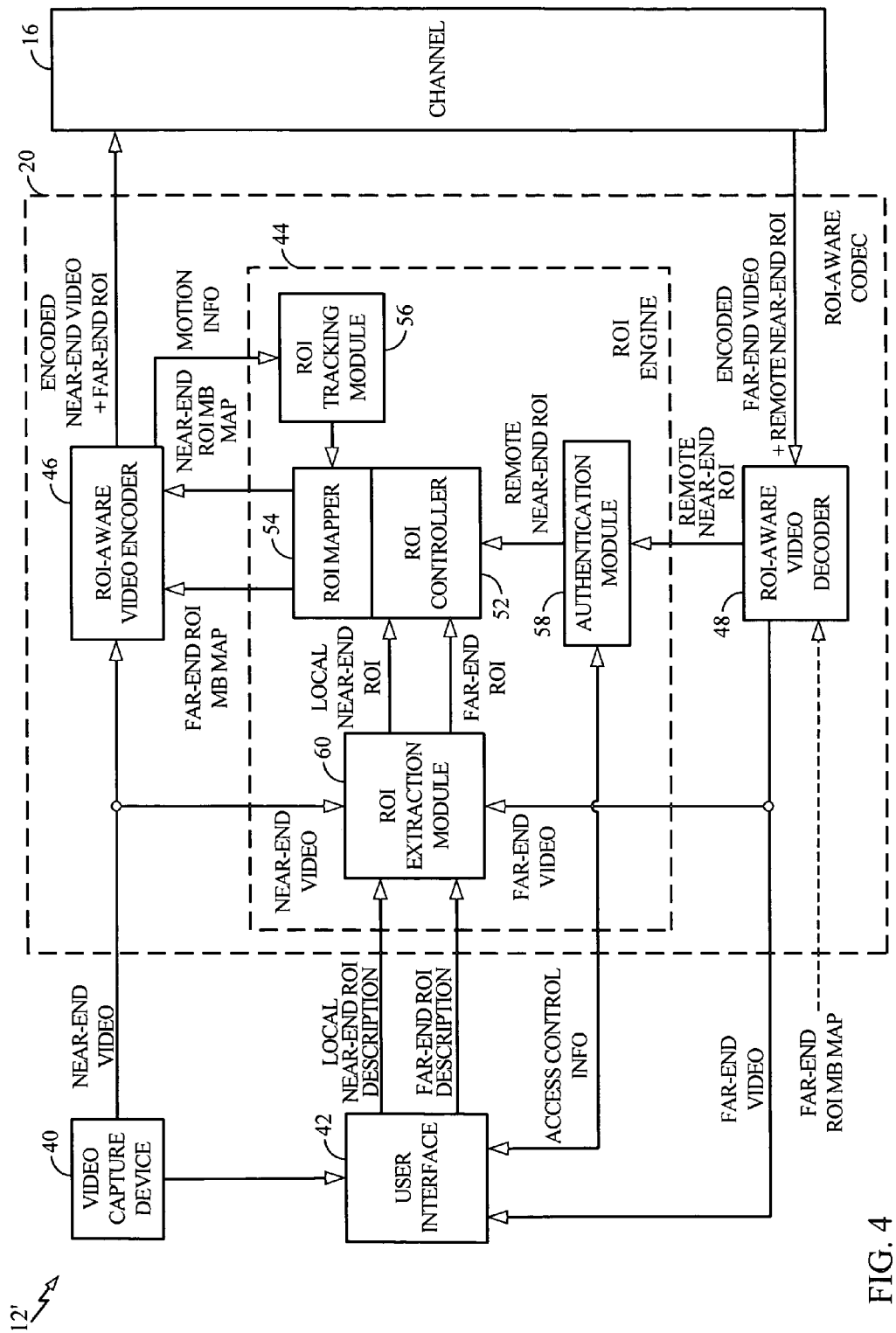
FIG. 4 is a block diagram illustrating another communication device with an ROI-aware CODEC, and further incorporating an ROI extraction module.

FIG. 4 is a block diagram illustrating another video communication device 12' with an ROI-aware CODEC, and further incorporating an ROI extraction module 60. Video communication device 12' of FIG. 4 conforms almost identically to video communication device 12 of FIG. 3. However, video communication device 12' further includes an ROI extraction module 60 to form a local near-end ROI and far-end ROI based on input from a user. In addition to simply handling selection of preconfigured ROI patterns or permitting a user to draw, reposition or resize a default ROI, ROI extraction module 60 permits a local user to specify an ROI by verbal or textual ROI description. In particular, ROI extraction module 60 generates a local near-end ROI or far-end ROI based on an ROI description provided by the local user.

Examples of ROI descriptions include textual or verbal input of terms such as "face," "moving object," "lips," "human," "background," and the like. Preferential encoding of such objects may be highly desirable. For example, preferential encoding of the lips or face may better represent facial expressions, mouthing of words, and the like. The textual input may be entered or selected from a menu presented by user interface 42. Verbal input may be provided by speaking into a microphone associated with video communication device 12'. In each case, the local user "describes" the ROI instead of selecting or drawing the ROI. ROI extraction module 60 converts the description to a set of coordinates within the applicable near-end or far-end video scene. In the event verbal ROI description is used, user interface 42 or ROI extraction module 60 may incorporate conventional speech recognition capabilities. In particular, ROI extraction module 60 may generate information specifying the ROI based on one or more recognized terms.

ROI extraction module 60 selects the ROI coordinates automatically by application of a conventional, pre-encoding processing algorithm configured to detect a desired ROI. In particular, ROI extraction module 60 may apply an algorithm for face detection, feature extraction, object segmentation, or tracking according to conventional techniques known to those skilled in the art of video ROI processing. For example, ROI extraction module 60 may apply conventional techniques that rely on ROI identification based on lumina or chroma values of pixels of the video input data.

A conventional face detection scheme typically involves the use of skin color as a guide to identify face versus non-face pixels. Examples of conventional face detection schemes are described in C.-W. Lin, Y.-J. Chang and Y.-C. Chen, "A low-complexity face-assisted coding scheme for low bit-rate video telephony," IEICE Trans. Inf. & Syst., vol. E86-D, no.

1, January 2003, pp. 101-108, and in D. Chai and K. N. Ngan, "Face segmentation using skin-color map in videophone applications," IEEE Trans. On Circuits and Systems for Video Technology, vol. 9, no. 4, June 1999, pp. 551-564.

When the local users describes the ROI in terms of a "face," ROI extraction module 60 analyzes the near-end or far-end video, as applicable, to automatically identify a face and designates coordinates associated with the identified face as the ROI. ROI extraction module 60 then passes the coordinates to ROI controller 52 for processing and mapping by ROI mapper 54. Notably, ROI extraction module 60 processes the local near-end ROI description or far-end ROI description, as applicable, maps the description to an appropriate extraction algorithm, and automatically analyzes the applicable pre-encoded near-end video or decoded far-end video to automatically extract the appropriate ROI.

In order to support automatic ROI detection, ROI extraction module 60 receives near-end video from video capture device 40 and far-end video from ROI-aware video decoder 48. Using the local near-end ROI description or far-end ROI description from user interface 42, as well as the automated detection algorithm, ROI extraction module 60 generates local near-end ROI and far-end ROI, as applicable, for application to ROI controller 52. In each case, ROI extraction module 60 converts the local near-end ROI description or far-end ROI description into coordinates that best fit the applicable description. In this case, there is no need for the user to draw the ROI. In addition, the user is not limited to a set of predefined ROI patterns. Instead, ROI controller 52 actively detects an appropriate region within the near-end video that matches the ROI description.

ROI mapper 54 maps the ROI coordinates to pertinent macroblocks (MBs) within a video frame, and generates a near-end or far-end ROI MB map. In effect, ROI mapper 54 translates the ROI coordinates from ROI controller 52 into a format that video encoder 46 can understand. In particular, video encoder 46 is equipped to handle encoding at the MB level, i.e., on an MB by MB basis. To that end, ROI mapper 54 generates an ROI MB map for the near-end or far-end video. The ROI MB map identifies the MBs that fall within the designated ROI so that video encoder 46 can apply preferential encoding to those MBs.

In addition to processing ROI descriptions, ROI extraction module 60 also may be equipped to handle ROI patterns that are selected by the local user from a set of predefined patterns, or drawn, repositioned or resized by the local user. Hence, video communication device 12' may generate ROI information substantially as described with respect to video communication device 12 of FIG. 3, but further incorporate ROI extraction module 60 to process ROI descriptions entered textually or verbally by the local user. ROI extraction module 60 may be desirable in terms of ease of use by the local user. However, some video communication devices may have insufficient processing power to support ROI extraction module 60. Accordingly, ROI extraction module 60 represents a desirable, but optional, component of a video communication device in accordance with this disclosure.

In some embodiments, ROI extraction module 60 may handle ROI descriptions that are generated not only by the local user, but also by the remote user. In this manner, the extraction functionality may be performed remotely rather than locally in some devices. For example, a particular video communication device 14 may have insufficient local resources or capabilities to support ROI extraction for ROI descriptions provided by a user of the device 14. However, another video communication device 12 may be better equipped for ROI extraction. In this case, it is contemplated that local ROI extraction may be offloaded or distributed to a remote video communication device.

In order to support remote extraction, ROI description may be provided to the remote device in a variety of ways. For example, verbal descriptions may be included in the audio stream transmitted to the remote device. Textual ROI descriptions, as well as predefined ROI patterns or drawn ROI patterns, likewise, may be transmitted to the remote device, e.g., by embedding such information in the encoded video stream. Hence, the ROI information sent from one device to another may take the form of a pre-processed ROI MB map, or any other indication or description of ROI, including indications or descriptions that require processing at the remote device prior to application to a remote encoder.

Figure 5:
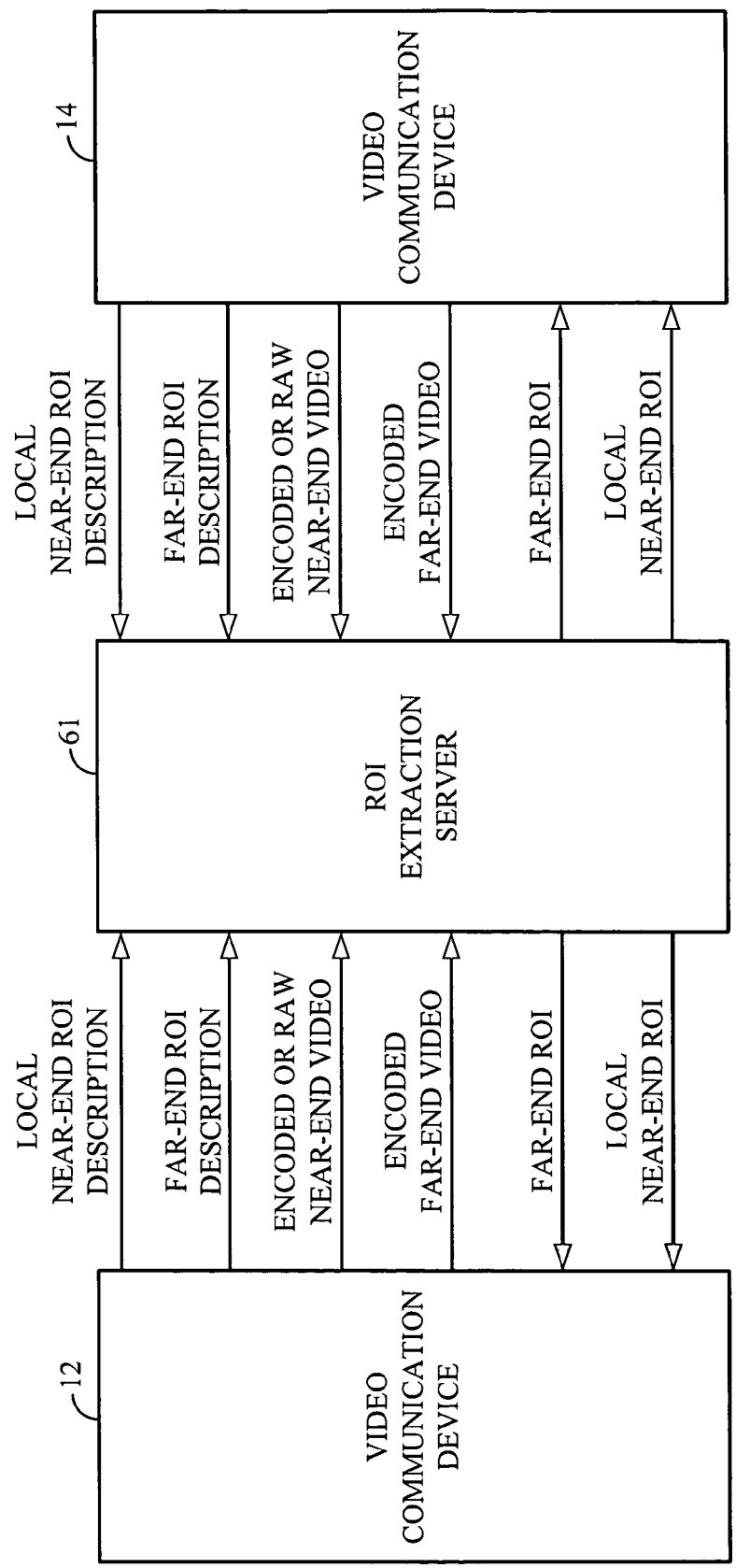
FIG. 5 is a block diagram illustrating distributed ROI extraction via an intermediate extraction server.

FIG. 5 is a block diagram illustrating distributed ROI extraction via an intermediate extraction server 61. As shown in FIG. 5, video communication device 12, 14 may provide sufficient information to intermediate extraction server 61 so that the ROI can be extracted. For example, each device 12, 14 may provide a respective local near-end ROI description, far-end ROI description, encoded or raw near-end video, and encoded far-end video. As an alternative to providing the encoded far-end video from a near-end device, ROI extraction server 61 may receive the far-end video directly from the far-end device. Using this information, extraction server 61 generates one or both of far-end ROI and local near-end ROI, and provides them to the respective device 12, 14. Extraction server 61 may be a server located anywhere within a communication network, and may be coupled to devices 12, 14 by wired media, wireless media, or a combination of both. Extraction server 61 may be located remotely from video communication devices 12, 14 or co-located with one of the devices 12, 14. In many instances, however, extraction server 61 may be a remote server. In general, extraction server 61 will be structurally distinct from video communication devices 12, 14.

Extraction server 61 may function much like extraction module 60, but operate on a remote, distributed basis, so that ROI extraction need not be performed locally within a device 12, 14. In this manner, the processing cost of ROI extraction can be distributed to a different device, which may have greater processing power. Like ROI extraction module 60, extraction server 61 may process different types of ROI descriptions, such as verbal, textual or graphic descriptions, by a user. To that end, ROI extraction server 61 may incorporate suitable capabilities, such as speech recognition capabilities to process the descriptions. In addition, ROI extraction server 61 may be equipped with video decoding capabilities to permit analysis of the video and extraction of the ROI, as well as encoding capabilities to re-encoded the video and embed the ROI information, if desired.

Figure 6:
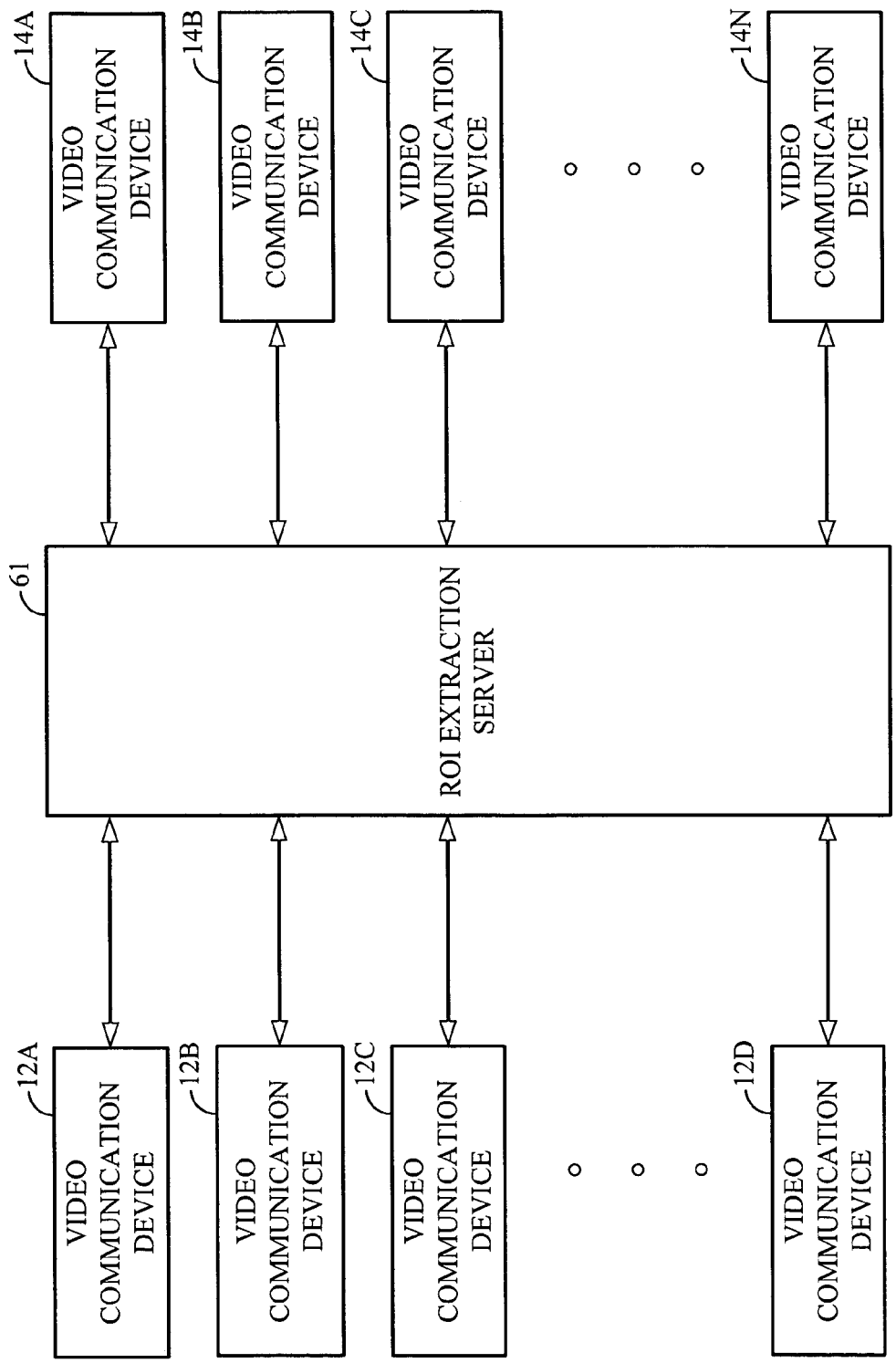
FIG. 6 is a block diagram illustrating distributed ROI extraction for multiple video telephony sessions.

FIG. 6 is a block diagram illustrating distributed ROI extraction for multiple video telephony sessions. In the example of FIG. 6, ROI extraction server 61 operates to handle ROI extraction for VT sessions between multiple video communication devices 12A-14A, 12B-14B, 12C-14D, through 12N-14N. In this manner, ROI extraction server 61 performs multiple ROI extraction tasks in parallel to support various VT sessions being conducted over a given communication network.

Figure 7A:
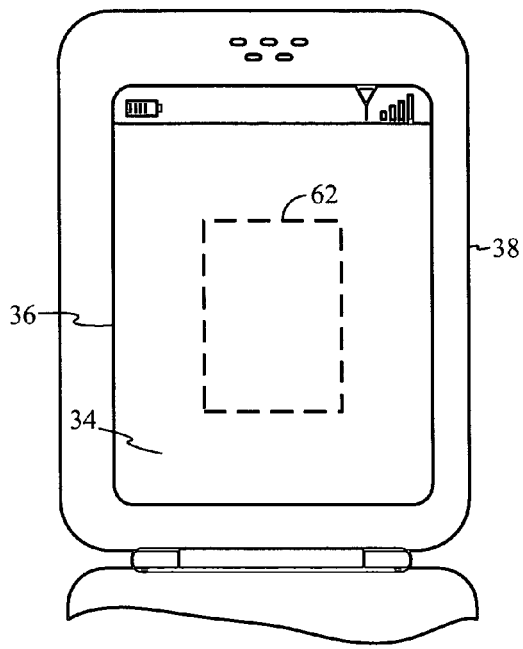
FIGS. 7A-7D are diagrams illustrating pre-defined ROI patterns for selection by a user.

FIGS. 7A-7D are diagrams illustrating pre-defined ROI patterns for selection by a local or remote user. The ROI patterns of FIGS. 7A-7D are for purposes of example, and should not be considered limiting. FIG. 7A shows an ROI 62 within a video scene 34 presented on a display 36 associated with a wireless communication device 38. ROI 62 is a basic rectangle that is substantially centered within video scene 34.

A major length of the rectangular ROI 62 extends vertically within video scene 34. In many cases, the predefined centered, rectangular ROI 62 will be effective in capturing a human face, i.e., the face of a remote user participating in a VT call.

Figure 7B:
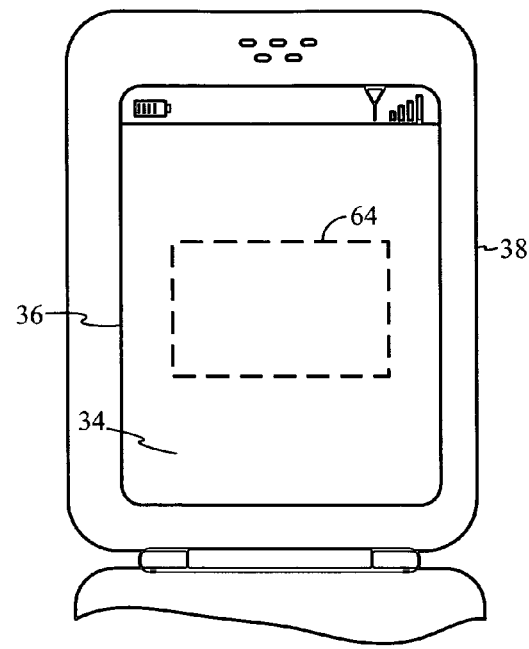

FIG. 7B shows another ROI 64, in the form of a rectangle having a major length that extends horizontally within video scene 34. ROI 64 is substantially centered within video scene 34 and may be effective in capturing objects such as vehicles, boats, products, presentations, and the like.

Figure 7C:
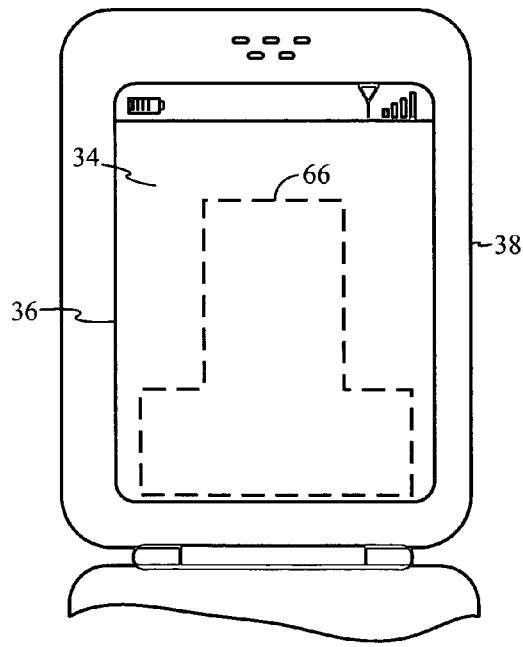

FIG. 7C shows another ROI 66 having a shape designed to capture the face and shoulders of a remote user participating in a VT call. Alternatively, ROI 66 may capture the face and shoulders of a correspondent giving a news broadcast, an emcee of a gathering, or a speaker at a conference, e.g., in a one-way video streaming application. In any event, the predefined ROI 66 focuses on a human VT participant or presenter, and achieves preferential coding for the physical features of that person.

Figure 7D:
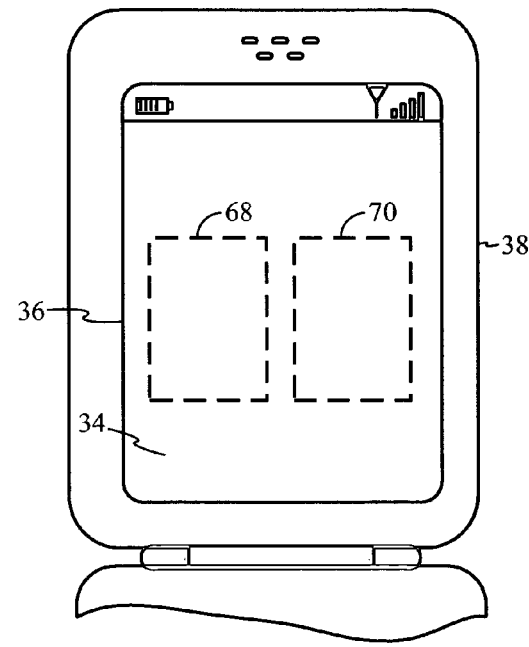

FIG. 7D shows a dual set of ROIs 68, 70 presented side-by-side within video scene 34. In the example of FIG. 5D, ROIs 68, 70 may be effective in capturing the faces of two persons sitting or standing side-by-side. In this manner, the faces of two participants may be preferentially encoded to support higher image quality for facial expressions and movement.

The predefined ROI patterns depicted in FIG. 7A-7D are for purposes of illustration. Other predefined ROI patterns having alternative positions or shapes may be provided. For example, some ROI patterns may have rounded or irregular shapes provided the patterns can be mapped to MB boundaries.

In some embodiments, a user may be permitted to resize or reposition a selected ROI pattern. Conventional cursor and corner dragging techniques may be used to achieve resizing and repositioning. In addition, resealing of ROI size may be achieved either by corner dragging or by explicitly specifying scale percentages. Of course, as the ROI becomes larger, the degree of preferential encoding is reduced due to bandwidth limitations. Accordingly, in some cases, a maximum ROI size may be enforced within video communication device 12.

Figure 8:
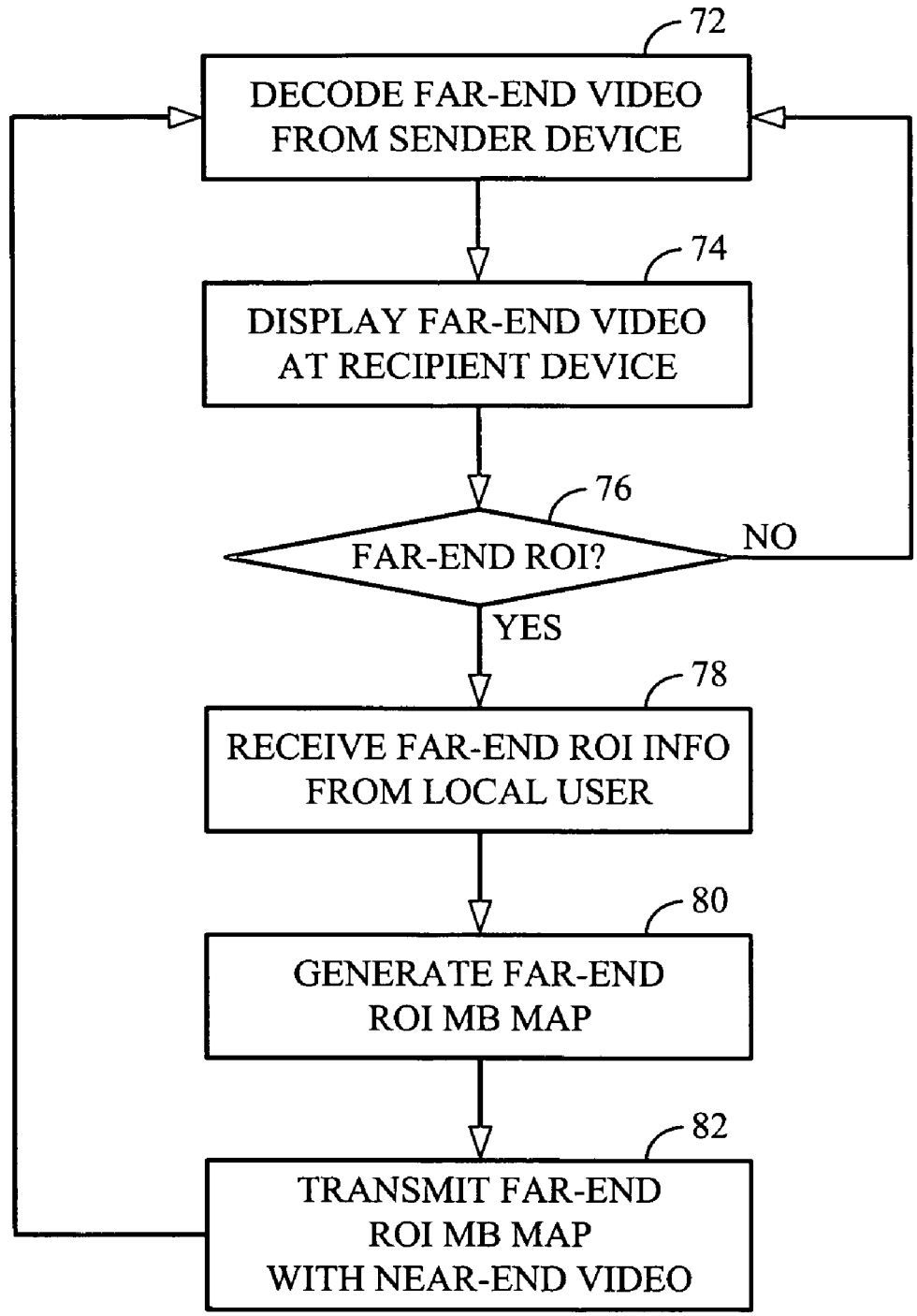
FIG. 8 is a flow diagram illustrating generation of ROI information at a recipient device to control preferential ROI encoding of near-end video at a remote sender device.

FIG. 8 is a flow diagram illustrating generation of far-end ROI information at a recipient device to control preferential ROI encoding in near-end video at a sender device. The process depicted in FIG. 8 may be implemented within video communication device 12 of FIG. 3 of video communication device 12' of FIG. 4. In operation, ROI-aware video decoder 48 within video communication device 12 decodes far-end video from a remote sender device (72), such as video communication device 14 (FIG. 1). Upon decoding the far-end video, user interface 42 of the recipient device 12 displays the far-end video for viewing by the local user (74).

If the local user does not request ROI selection (76), no action is taken and the next frame of far-end video is decoded (72). If ROI selection is requested (76), however, user interface 42 accepts far-end ROI information from the local user (78). ROI controller 52 and ROI mapper 54 then cooperate to generated a far-end ROI MB map (80). ROI-aware encoder 46 embeds the far-end ROI MB map in the encoded near-end video and thereby transmits the far-end ROI map to the remote sender device 14 that encodes the far-end video (82). The far-end ROI MB map specifies that the encoder associated with the remote video communication device 14 should apply preferential encoding to MBs within the pertinent ROI of the far-end video to be sent to video communication device 12.

Figure 9:
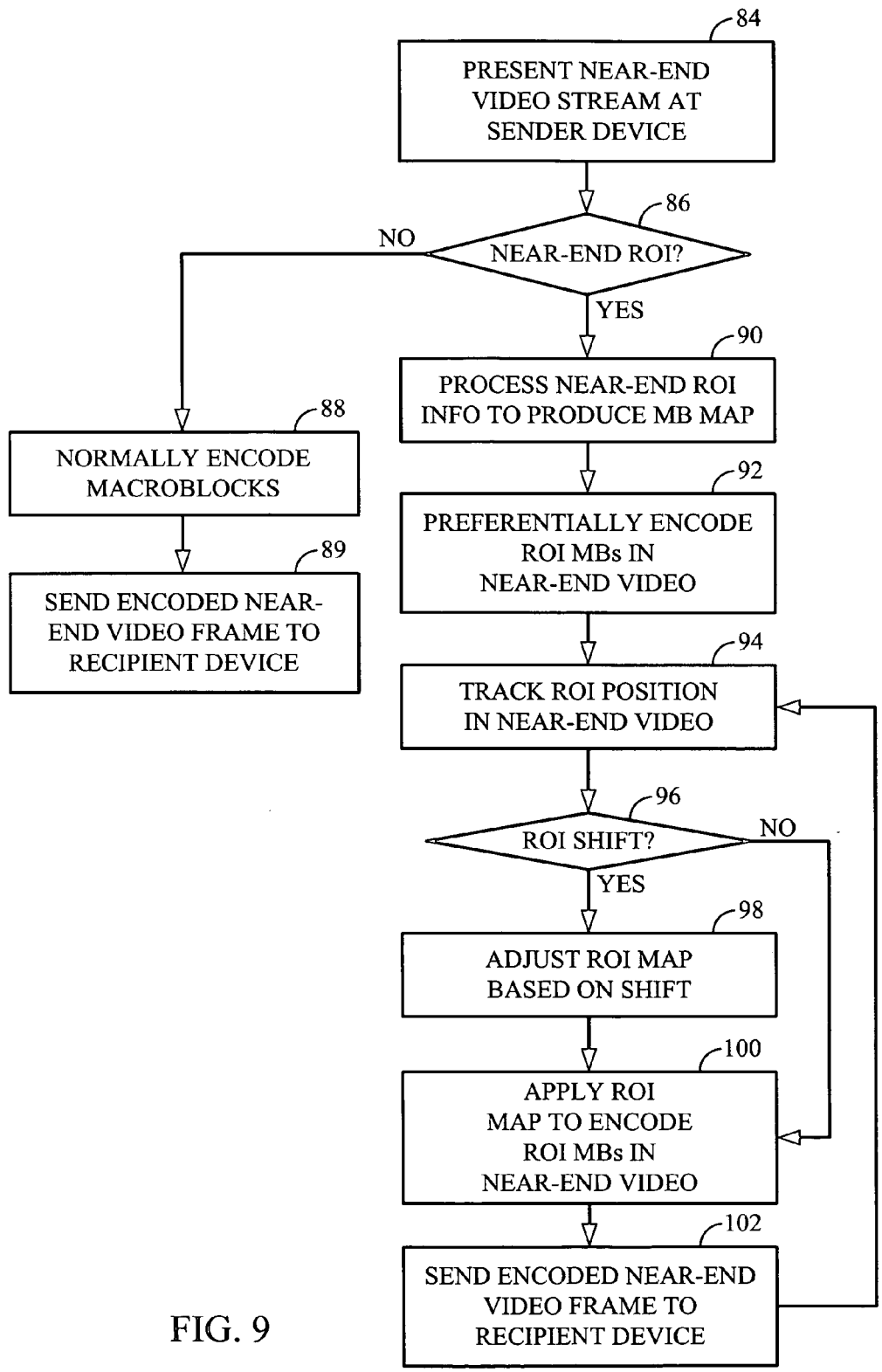
FIG. 9 is a flow diagram illustrating processing of ROI information from a recipient device for preferential ROI encoding of near-end video at a sender device, in combination with ROI tracking.

FIG. 9 is a flow diagram illustrating processing of near-end ROI information from a recipient device for preferential ROI encoding in near-end video at a sender device, in combination with ROI tracking. In the example of FIG. 9, user interface 42 receives a near-end video stream generated by video capture device 40 and presents the near-end video to a local user (84). If neither the local user nor the remote user requests near-end ROI selection (86), all MBs within each video frame are normally encoded (88), i.e., without any preferential encoding of MBs within an ROI. The encoded near-end video is then sent to the remote recipient device 14 (89).

If near-end ROI selection is requested by the local user or the remote user (86), however, ROI controller 52 and ROI mapper 54 process the pertinent near-end ROI information to produce a near-end ROI MB map (90). If near-end ROI is specified by both the local user and the remote user, authentication module 58 may intervene to resolve the conflict in favor of one of the ROIs. Upon receipt of the near-end ROI MB map (90), ROI-aware video encoder 46 preferentially encodes the MBs within the ROI (92) by applying higher quality encoding, stronger error protection or both.

Tracking module 56 tracks the position of the ROI within the near-end video (94) by monitoring motion information generated by ROI-aware video encoder 46. If a shift in the ROI is not detected (96), the existing ROI map is applied to encode ROI MBs within the near-end video (100) and the encoded near-end video is sent to the remote recipient device (102). If a shift in the ROI is detected (96), video tracking module 56 adjusts the ROI MB map (98) based on the motion information prior to encoding the near-end video (100).

Figure 10:
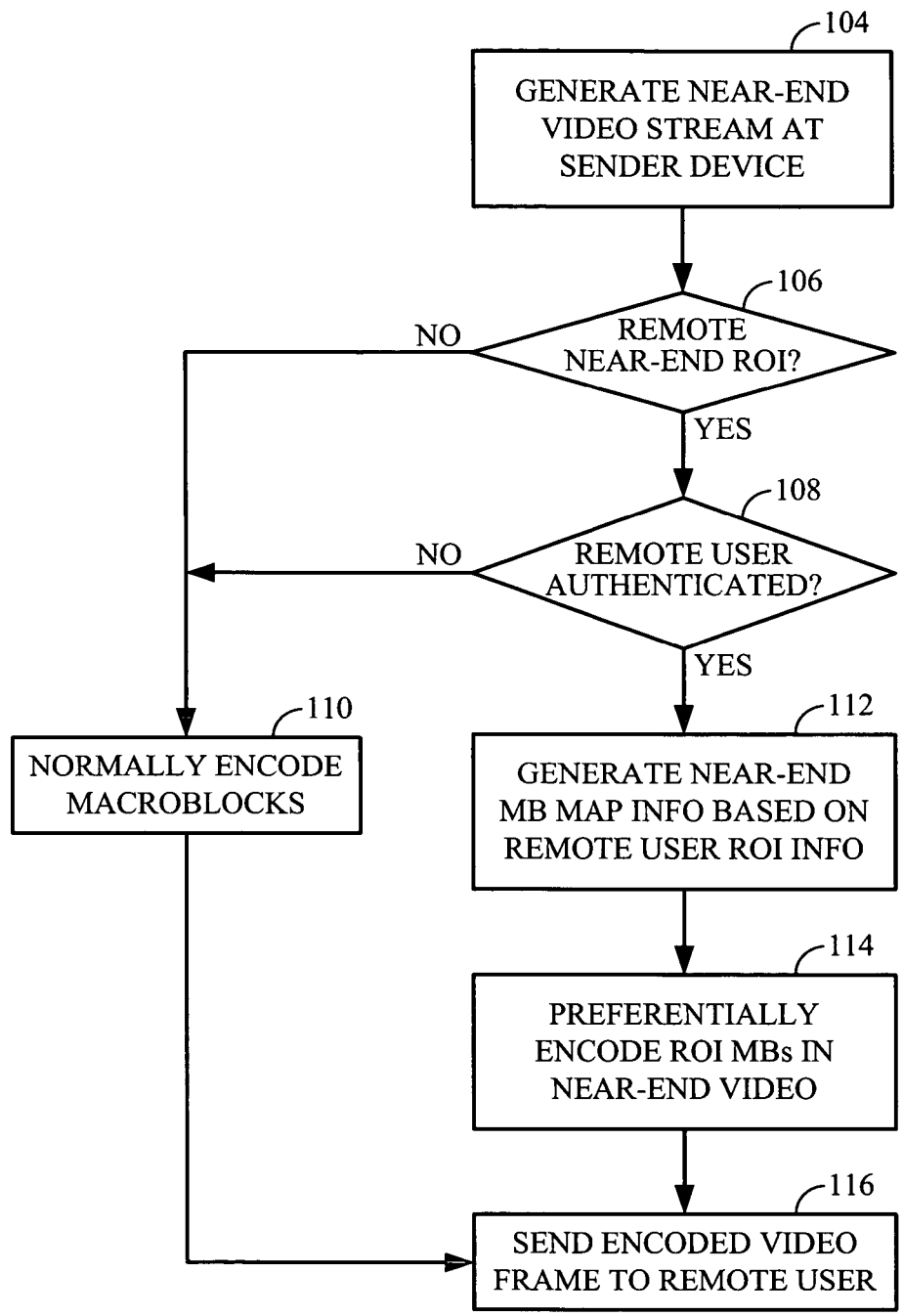
FIG. 10 is a flow diagram illustrating processing of ROI information from a recipient device for preferential ROI encoding of near-end video at a sender device, in combination with user authentication.

FIG. 10 is a flow diagram illustrating processing of ROI information from a recipient device for preferential ROI encoding in near-end video at a sender device, in combination with user authentication. FIG. 10 depicts operation of authentication module 58 of FIG. 3 or FIG. 4 in permitting a remote user to control near-end ROI and, for simplicity, assumes that no local near-end ROI is specified. As shown in FIG. 10, for a near-end video stream generated by video capture device 40 in video communication device 12 (104), authentication module 58 determines whether a remote near-end ROI has been requested (106) by a remote user of video communication device 14.

If no remote near-end ROI is requested (106), and no local near-end ROI is specified, all MBs in the near-end video are normally encoded (110). If a remote near-end ROI is requested (106), however, authentication module 58 next determines whether the remote user that requested the near-end ROI is authenticated (108). In particular, authentication module 58 may automatically determine access rights of the remote user by reference to an address book stored locally in the video communication device 12. Alternatively, authentication module 58 may actively query the local user via user interface 42 to obtain approval or denial of the access rights for near-end ROI control by the remote user.

If the remote user is not authenticated (108), all MBs in the near-end video are normally encoded (110). If the remote user is authenticated (108), however, the remote user is granted near-end ROI control. In this case, ROI controller 52 and ROI mapper 54 process near-end ROI information from the remote user and generate a near-end MB map (112). Using the near-end MB map, ROI-aware encoder 46 preferentially encodes the MBs identified by the near-end MB map (114). Video communication device 12 then sends the encoded near-end video to the remote video communication device 14 (116).

Figure 11:
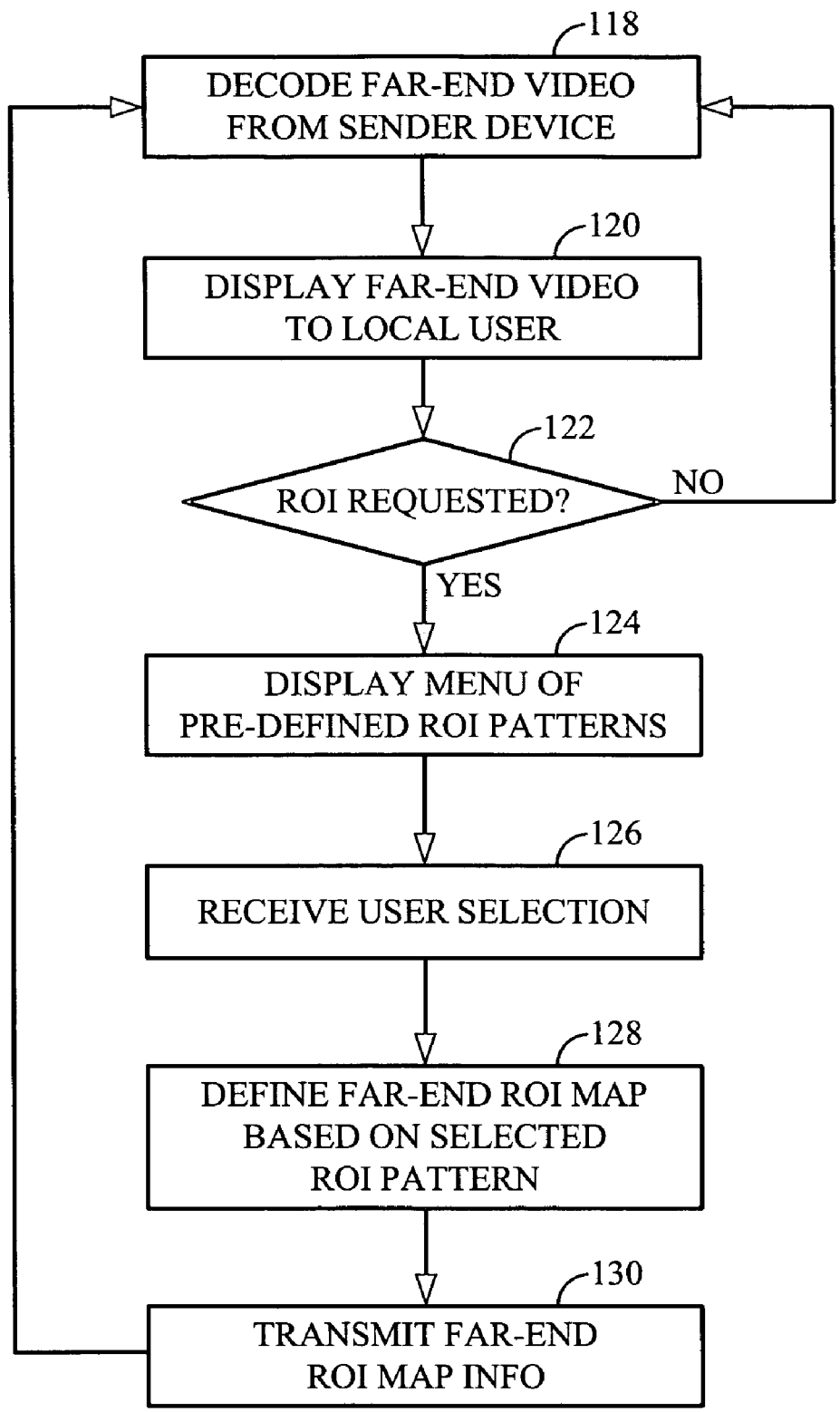
FIG. 11 is a flow diagram illustrating selection of pre-defined ROI patterns.

FIG. 11 is a flow diagram illustrating selection of predefined ROI patterns. Once ROI-aware video decoder 48 decodes the far-end video received from remote video communication device 14 (118), the far-end video is displayed to the local user via user interface 42 (120). If the local user requests ROI selection (122), user interface 42 displays a menu of pre-defined ROI patterns (124), such as those ROI patterns shown in FIGS. 7A-7D. Alternatively, the user may provide an ROI description or draw, reposition or resize an ROI pattern. In the example of FIG. 11, however, operation focuses on presentation of predefined ROI patterns. Upon selection of a predefined ROI pattern by the local user (126), ROI controller 52 and ROI mapper 54 define an ROI MB map based on the selected pattern (128). ROI-aware video encoder 46 embeds the ROI MB map within the encoded near-end video and transmits the ROI MB map to the remote video communication device 14 (130) for use in preferential encoding of the ROI in the far-end video.

Figure 12:
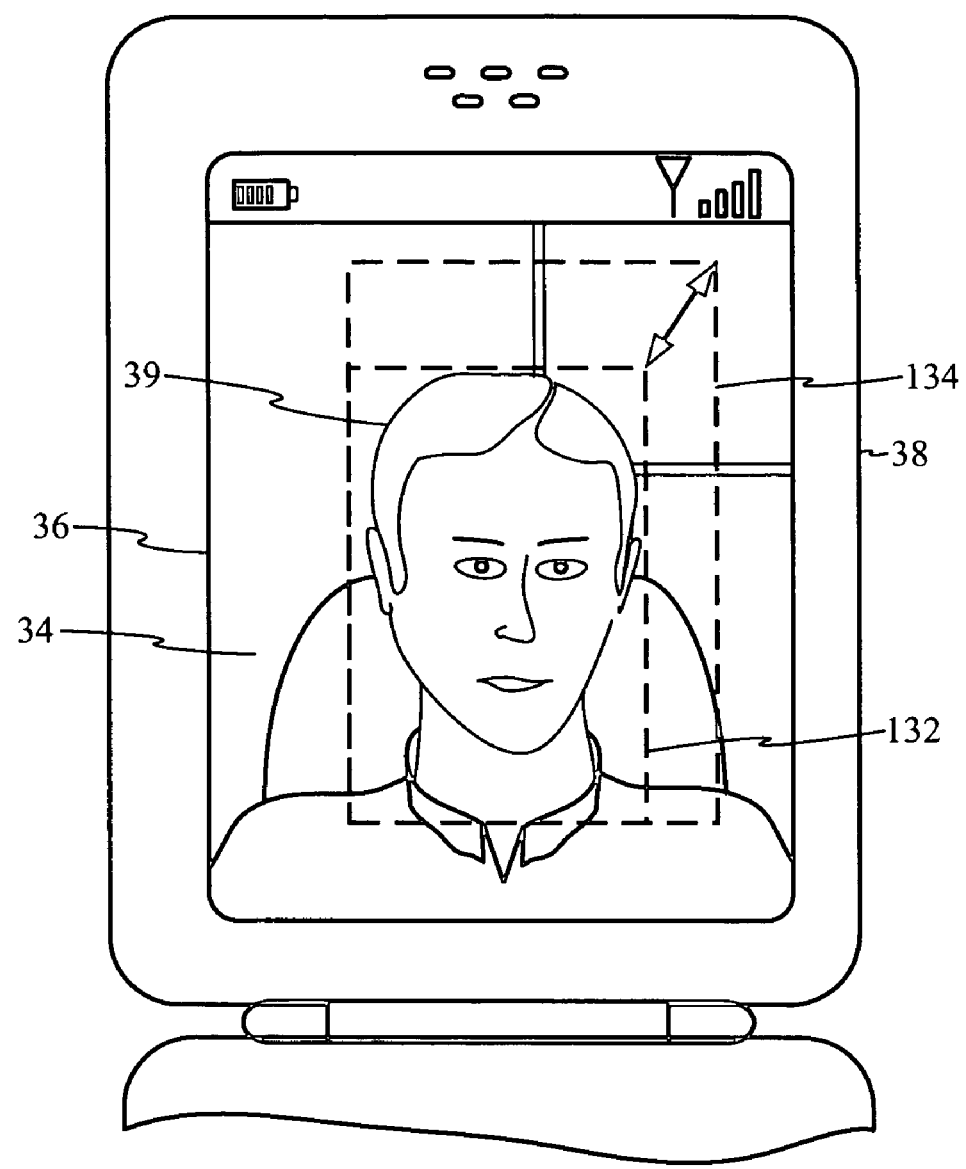
FIG. 12 is a diagram illustrating definition of an ROI pattern in a displayed video scene by expansion and contraction of an ROI template.

FIG. 12 is a diagram illustrating definition of an ROI pattern in a displayed video scene 34 by expansion and contraction of an ROI template 132. FIG. 12 substantially corresponds to FIG. 2, but illustrates the presentation of an ROI template 132 that can be resized by a user. In the example of FIG. 12, ROI template 132 can be resized by corner dragging one of the corners of the ROI template to expand and contract the ROI template. The result of corner dragging to expand ROI template 132 is represented by expanded ROI template 134. Corner dragging results in an increase or decrease in size of ROI template 132, but maintains relative length to width ratio scaling. In some embodiments, however, the user also may be permitted to drag a side of ROI template 132 so as to increase or decrease the size of the ROI template while also changing the length to width ratio scaling. Dragging can be achieved using a stylus in combination with a touchscreen, or another pointing device associated with user interface 42 of video communication device 12. Other pointing devices may include joysticks, touchpads, scroll wheels, trackballs, and the like.

Figure 13:
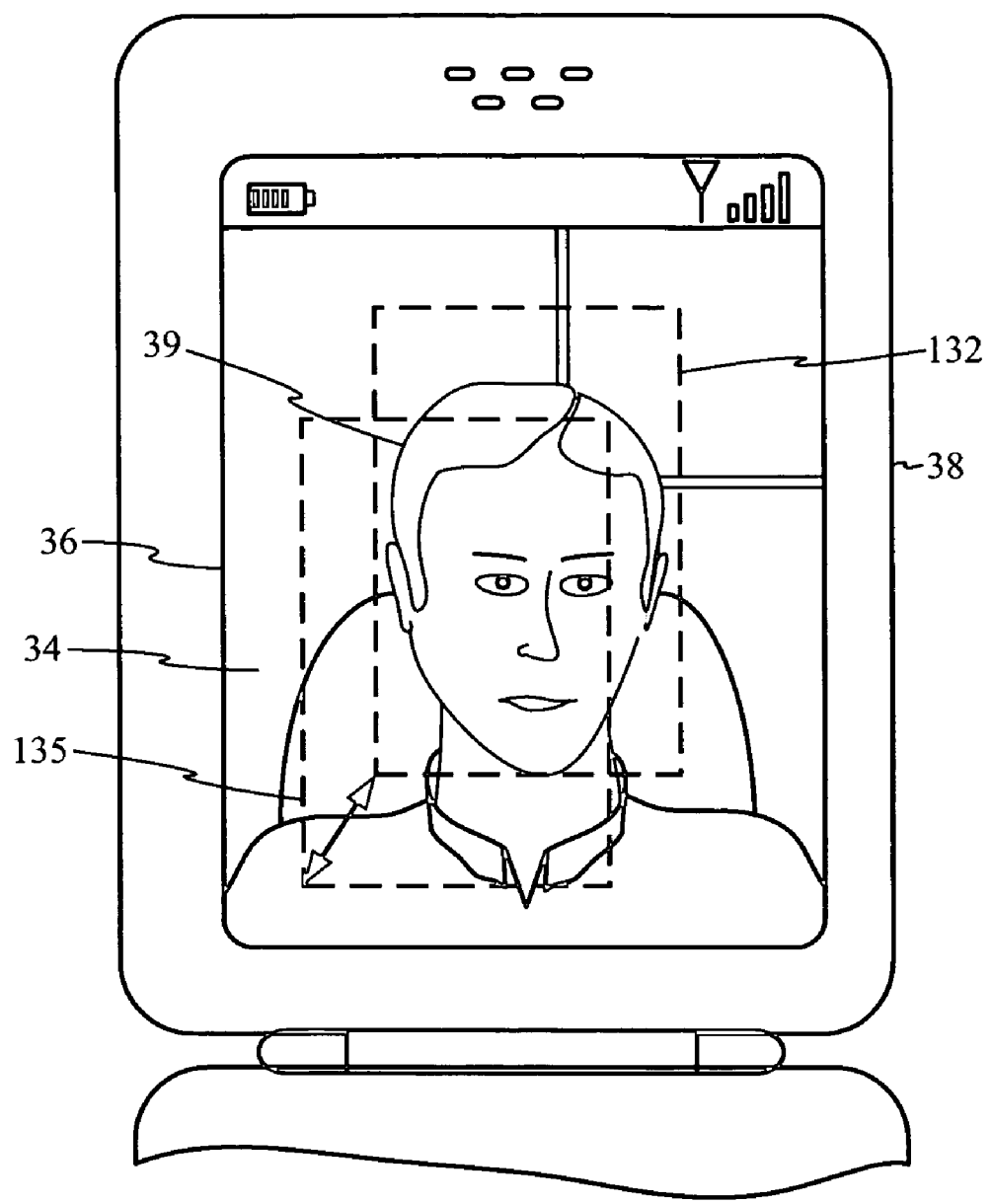
FIG. 13 is a diagram illustrating definition of an ROI pattern in a displayed video scene by dragging an ROI template.

FIG. 13 is a diagram illustrating definition of an ROI pattern in a displayed video scene by dragging an ROI template 132. In particular, FIG. 13 shows repositioning of ROI template 132 by dragging the ROI template to another position 135 within video scene 34. The dragging may be accomplished by a stylus and touchscreen or another pointing device associated with user interface 42.

Figure 14:
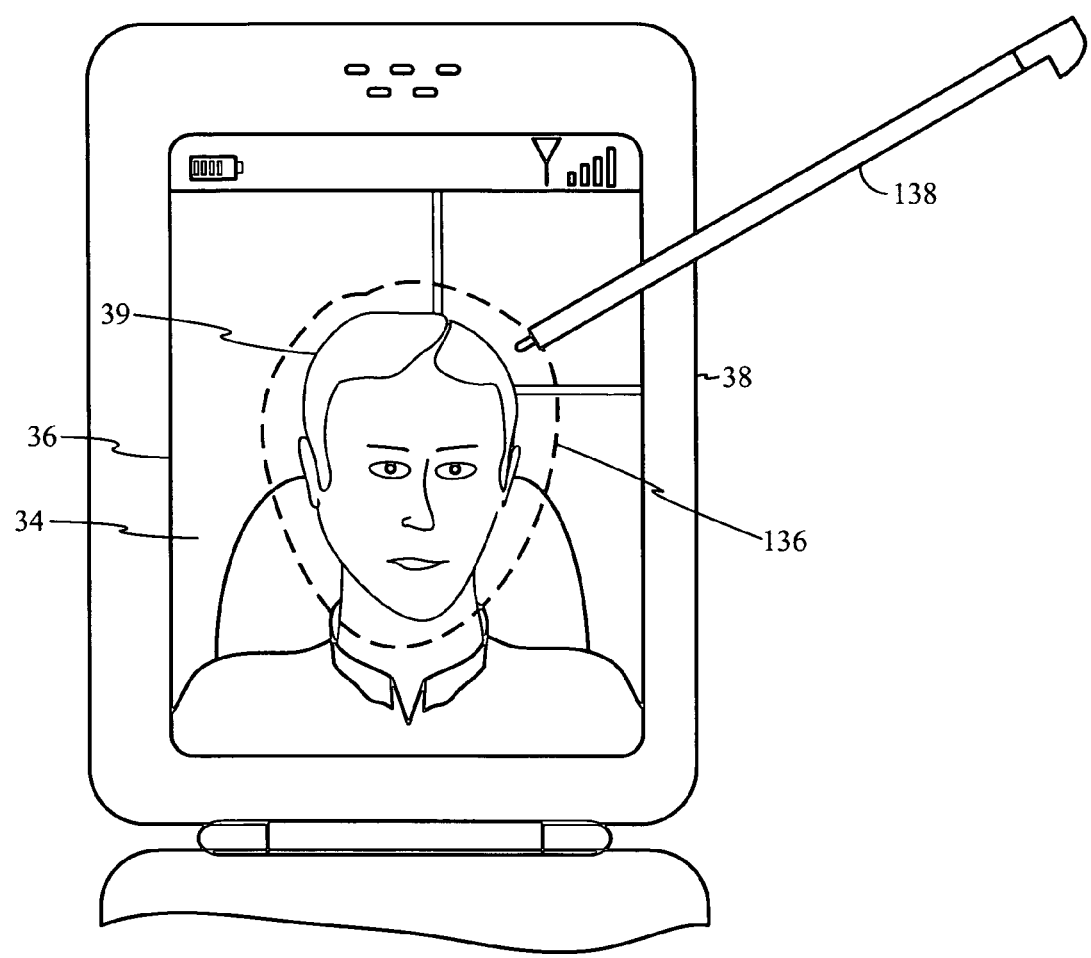
FIG. 14 is a diagram illustrating definition of an ROI pattern in a displayed video scene by drawing an ROI area on a touchscreen with a stylus.

FIG. 14 is a diagram illustrating definition of an ROI pattern in a displayed video scene by drawing an ROI pattern 136 on a touchscreen with a stylus 138. In the example of FIG. 14, the ROI pattern 136 is produced by free-hand drawing. ROI controller 52 and ROI mapper 54 cooperate to convert coordinates associated with drawn ROI pattern into an MB map that identifies MBs within the video scene 34 that fall approximately within the ROI pattern 136. Definition of an ROI pattern as shown in FIGS. 12, 13, and 14 may be applied for an ROI within near-end video or far-end video.

Figure 15:
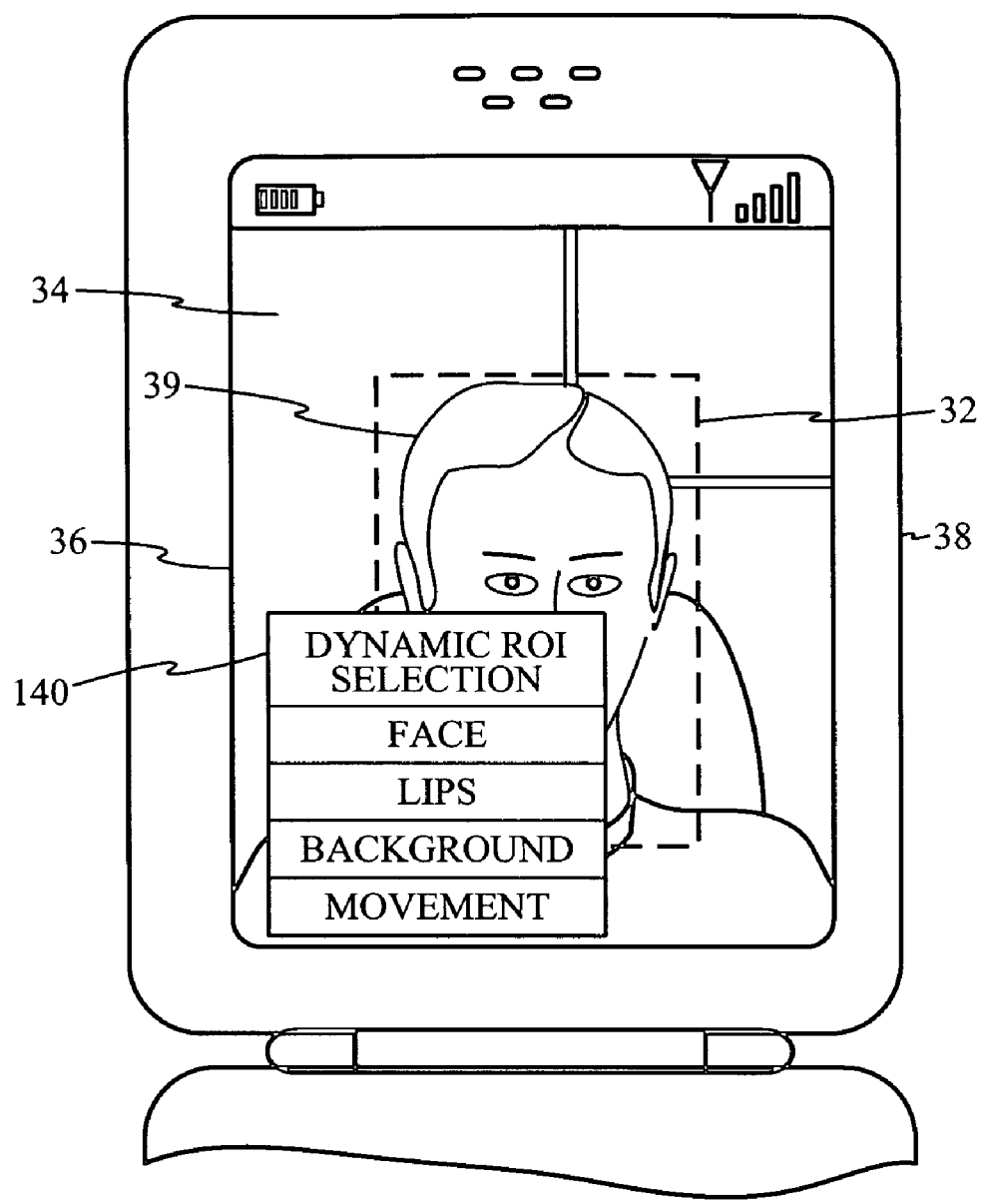
FIG. 15 is a diagram illustrating definition of an ROI pattern in a displayed video scene using a drop-down menu with specified ROI objects to be dynamically extracted and tracked.

FIG. 15 is a diagram illustrating definition of an ROI pattern in a displayed video scene using a drop-down menu 140 with specified ROI objects to be dynamically tracked. As shown in FIG. 15, user interface 42 presents a drop-down menu 140 presenting ROI descriptions such as "FACE," "LIPS," "BACKGROUND," and "MOVEMENT." The local user selects one of the entries in the drop-down menu as the desired ROI description. In response, ROI extraction module 60 (FIG. 4) analyzes the near-end video or far-end video, as applicable, to detect an ROI pattern that corresponds to the description. As an alternative to drop-down menu 140, the user may enter text via user interface 42 or verbally utter text into a microphone. In each case, the selected ROI is matched to an appropriate ROI pattern using conventional feature detection algorithms such as skin-tone detection, object segmentation or the like. Upon selection of an ROI pattern, ROI controller 52 and ROI mapper 54 generate an appropriate ROI MB map. The process in FIG. 15 is referred to as "dynamic" in the sense that each ROI description must be dynamically matched with an ROI pattern within the particular video scene under consideration.

Figure 16:
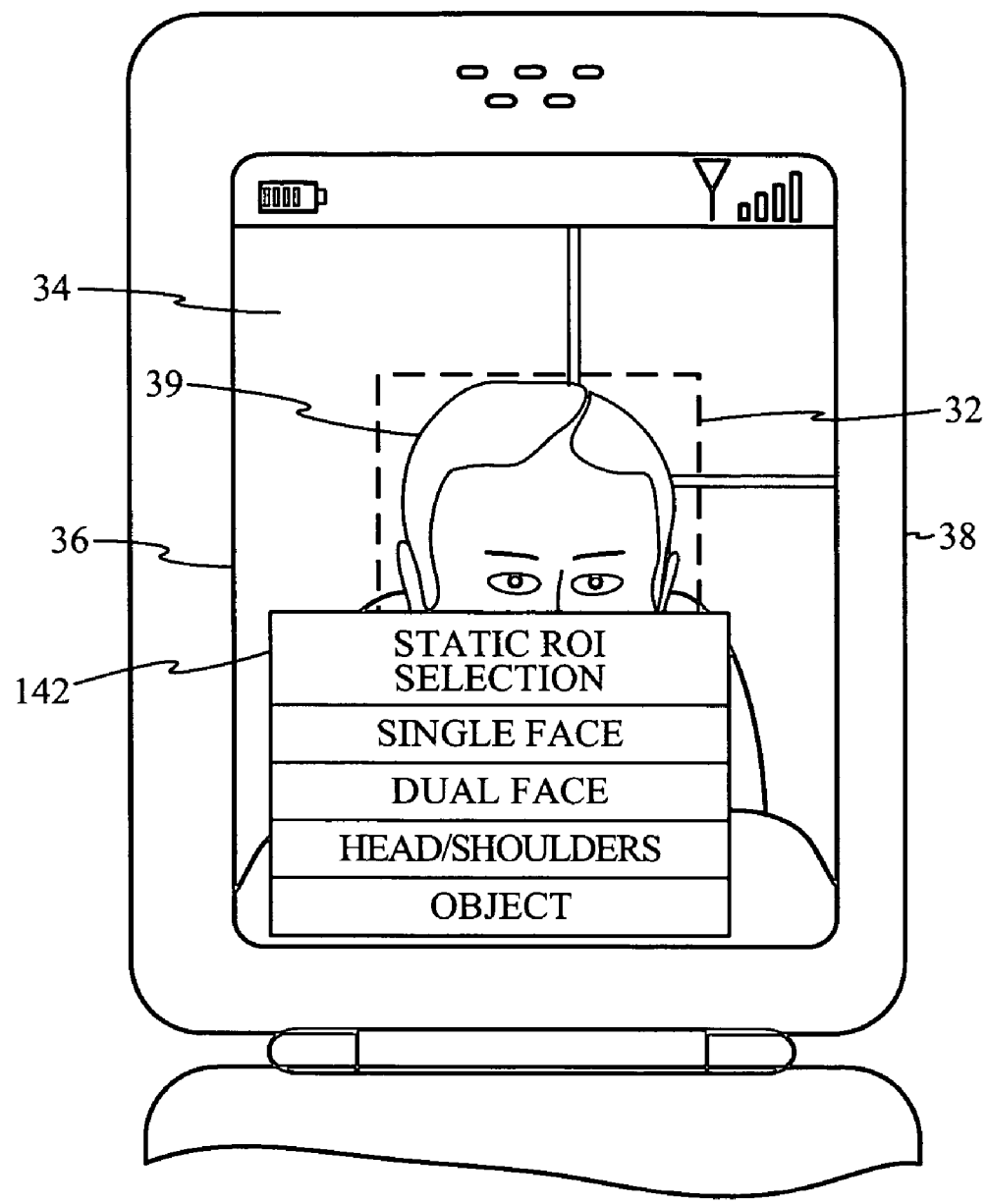
FIG. 16 is a diagram illustrating definition of an ROI pattern in a displayed video scene using a drop-down menu with specified ROI objects mapped to pre-defined ROI patterns, as in FIGS. 7A-7D.

FIG. 16 is a diagram illustrating definition of an ROI pattern in a displayed video scene using a drop-down menu 142 with specified ROI objects mapped to pre-defined ROI patterns, as in FIGS. 7A-7D. As shown in FIG. 16, user interface 42 presents a drop-down menu 142 presenting ROI descriptions such as "SINGLE FACE," "DUAL FACE," "HEAD/SHOULDERS," and "OBJECT." The local user selects one of the entries in the drop-down menu as the desired ROI pattern. In response, ROI controller 52 matches the selected ROI pattern to a corresponding predefined ROI pattern, such as those depicted in FIGS. 7A-7D. Accordingly, unlike the ROI descriptions shown in FIG. 15, the static ROI patterns require no video analysis. Instead, ROI controller 52 and ROI mapper 54 generate preconfigured ROI MB maps that correspond to the choices in drop-down menu 142. Again, as an alternative to drop-down menu 142, the user may enter text via user interface 42 or verbally utter text into a microphone. The process in FIG. 15 is referred to as "static" in the sense that each ROI pattern corresponds to a predefined ROI pattern and MB map.

Figure 17:
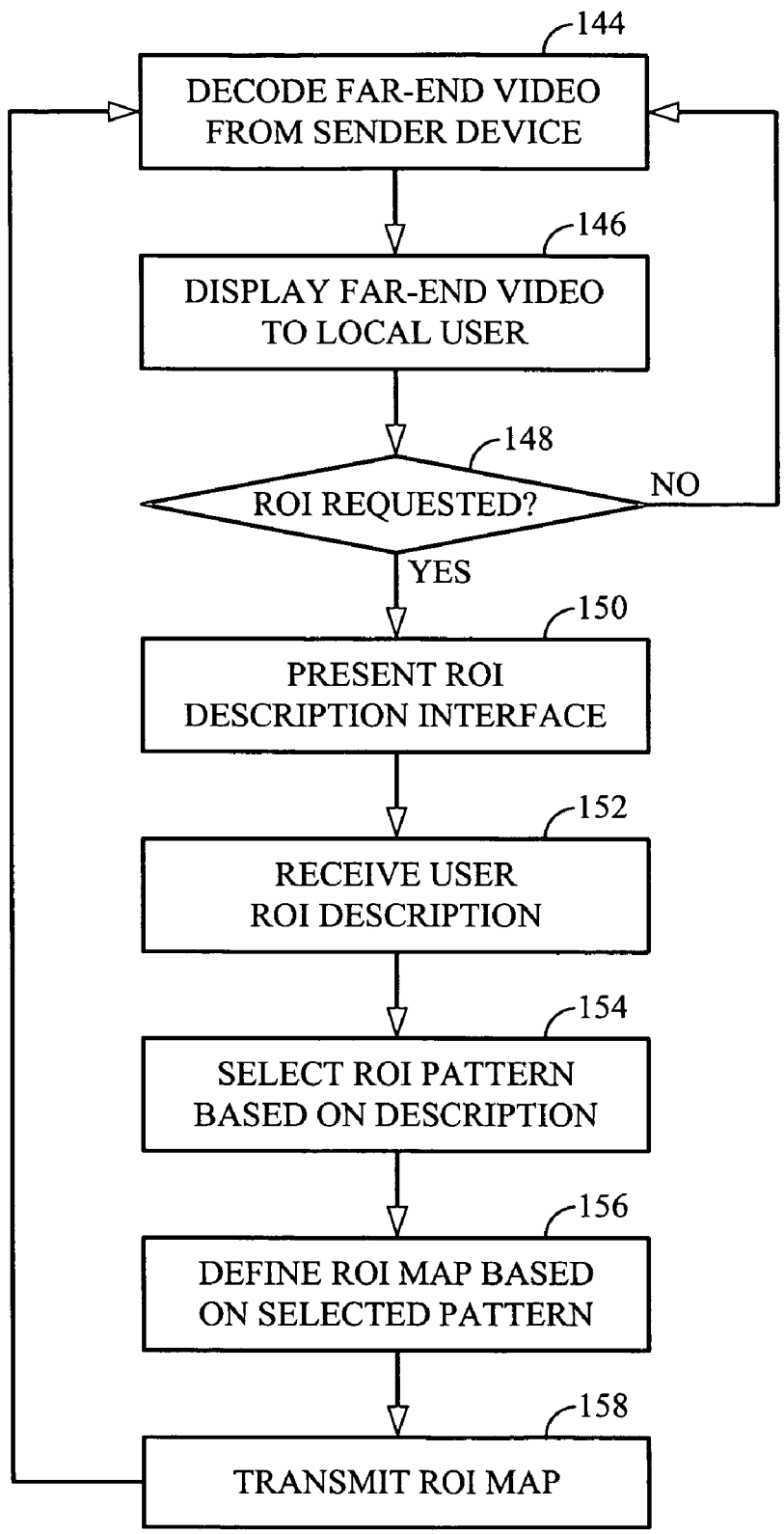
FIG. 17 is a flow diagram illustrating definition of an ROI pattern in a displayed video scene using an ROI description interface.

FIG. 17 is a flow diagram illustrating definition of an ROI pattern in a displayed video scene using an ROI description interface. The process shown in FIG. 17 may be used in conjunction with the drop-down menu of FIG. 15, or other input media. As shown in FIG. 17, ROI-aware video decoder 48 decodes far-end video received from a remote sender device 14 (144). User interface 42 then displays the far-end video to the local user (146). If the local user does not request ROI selection for the far-end video (148), no ROI information is sent to the remote video communication device 14. If ROI selection is requested (148), however, user interface 42 presents an ROI description interface (150), such as drop-down menu 140 of FIG. 17.

Upon receiving the local user ROI description (152), ROI controller 52 and ROI mapper 54 select an ROI pattern based on the description (154) and define an ROI MB map based on the selected ROI pattern (156). Again, the selected ROI pattern may be determined by analyzing the far-end video using conventional detection techniques, and matching the ROI description to particular MBs within the far-end video. Upon generation of the far-end ROI MB map, ROI-aware video encoder 12 embeds the far-end ROI MB map in the encoded near-end video and transmits it to the remote video communication device 14 for preferential encoding of the far-end ROI.

Figure 18:
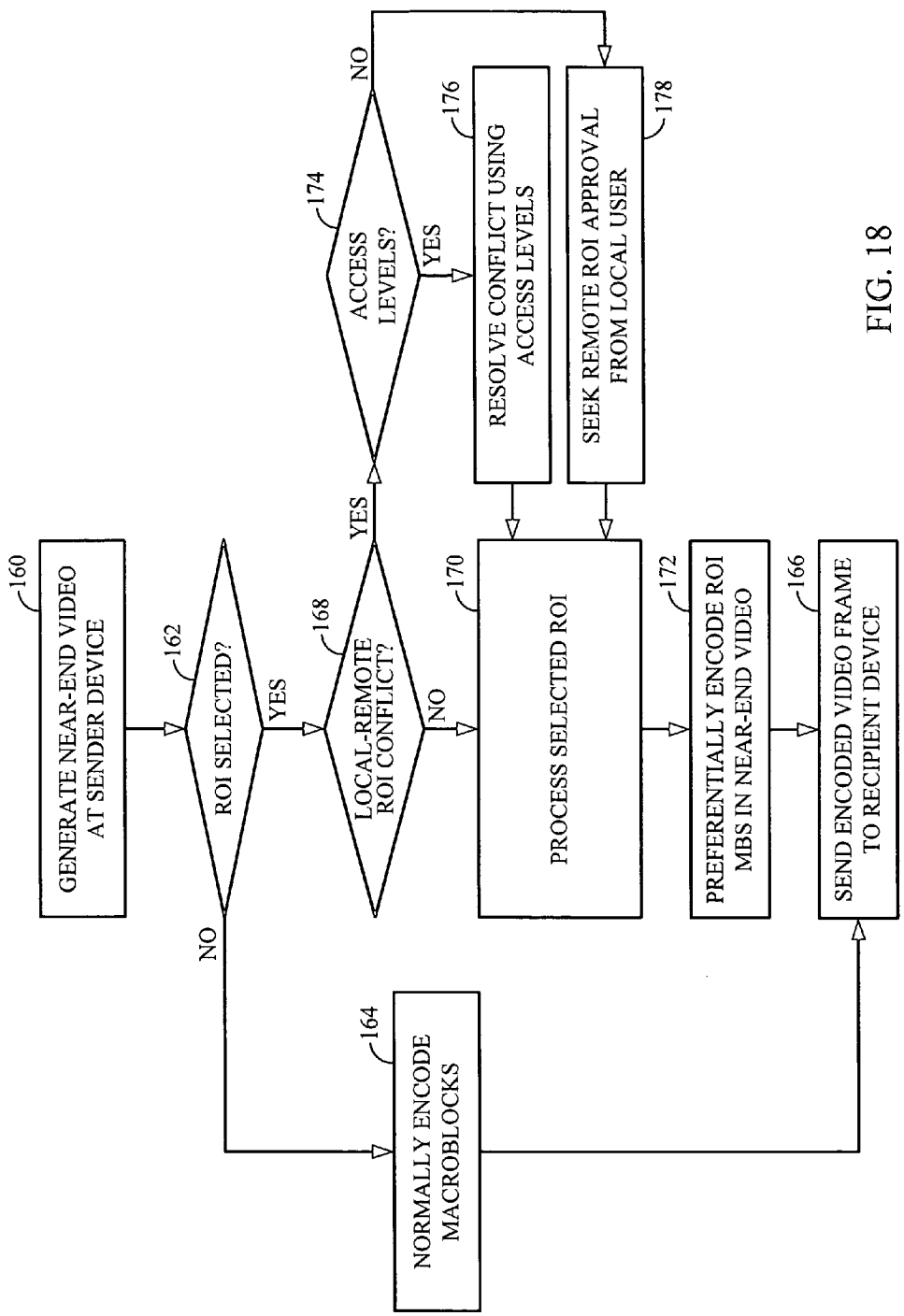
FIG. 18 is a flow diagram illustrating resolution of ROI conflicts between sender and recipient devices.

FIG. 18 is a flow diagram illustrating resolution of ROI conflicts between sender and recipient devices 12, 14. In particular, FIG. 18 illustrates operation of authentication module 58 (FIG. 3 or FIG. 4) in resolving conflicts between near-end ROI designated by a local user and near-end ROI designated by a remote user. Upon generation of near-end video at a sender device (160), authentication module 58 determines whether near-end ROI has been requested by a local user or remote user (162). If not, all MBs are normally encoded (164) without preferential encoding of an ROI, and the resulting encoded video is sent to the recipient video communication device 14 (166).

If near-end ROI is requested (162), authentication module 58 determines whether there is a conflict between near-end ROI specified by a local user and near-end ROI specified by a remote user (168). If there is no remote near-end ROI specified, or if the local and remote near-end ROI are in agreement, authentication may pass the selected near-end ROI to ROI controller 52 for processing.

If there is no local near-end ROI, but a remote near-end ROI has been selected, authentication module 58 may permit the remote near-end ROI to be applied. Alternatively, in some embodiments, authentication module 58 may permit the remote near-end ROI to be applied only if there is explicit access granted to the remote user, either by local user interaction or by an access level recorded in an address book. If there is no ROI conflict, ROI mapper 54 generates a near-end MB map based on the applicable near-end ROI and applies it to ROI-aware video encoder 46. ROI-aware video encoder 46 then preferentially encodes the MBs within the ROI of the near-end video (172).

If there is a conflict between the local and remote near-end ROI (168), authentication module 58 determines whether access levels have already been assigned (174), e.g., in an address book locally stored within video communication device 12. If access levels are assigned (174), authentication module 58 resolves the ROI conflict according to the access levels (176). For example, the stored access level for the remote user may indicate that the remote user should be granted ROI control over the local user. If access levels are not assigned (174), authentication module 58 seeks approval of remote ROI control from the local user (178). In particular, authentication module 58 may present a query via user interface 42 to request approval of near-end ROI control by the remote user.

If approval is given by the local user, authentication module 58 passes the remote near-end ROI to ROI controller 52 for processing. If approval is not given, ROI controller 52 processes the local near-end ROI. In either case, ROI-aware video encoder 46 use the selected ROI to preferentially encode MBs within the near-end video that fall within the ROI (172), and sense the encoded near-end video to the remote recipient device 14 (166). In some cases, authentication module 58 may resolve ROI conflicts between not only the local user and a remote user, but possibly several remote users. The local user may actively grant access rights to control near-end ROI to one of the remote users, or assign relative access levels that prioritize the ROI control rights of the various remote users. Typically, access rights to control ROI is granted exclusively to one user, e.g., the local user or one of the remote users.

Figure 19:
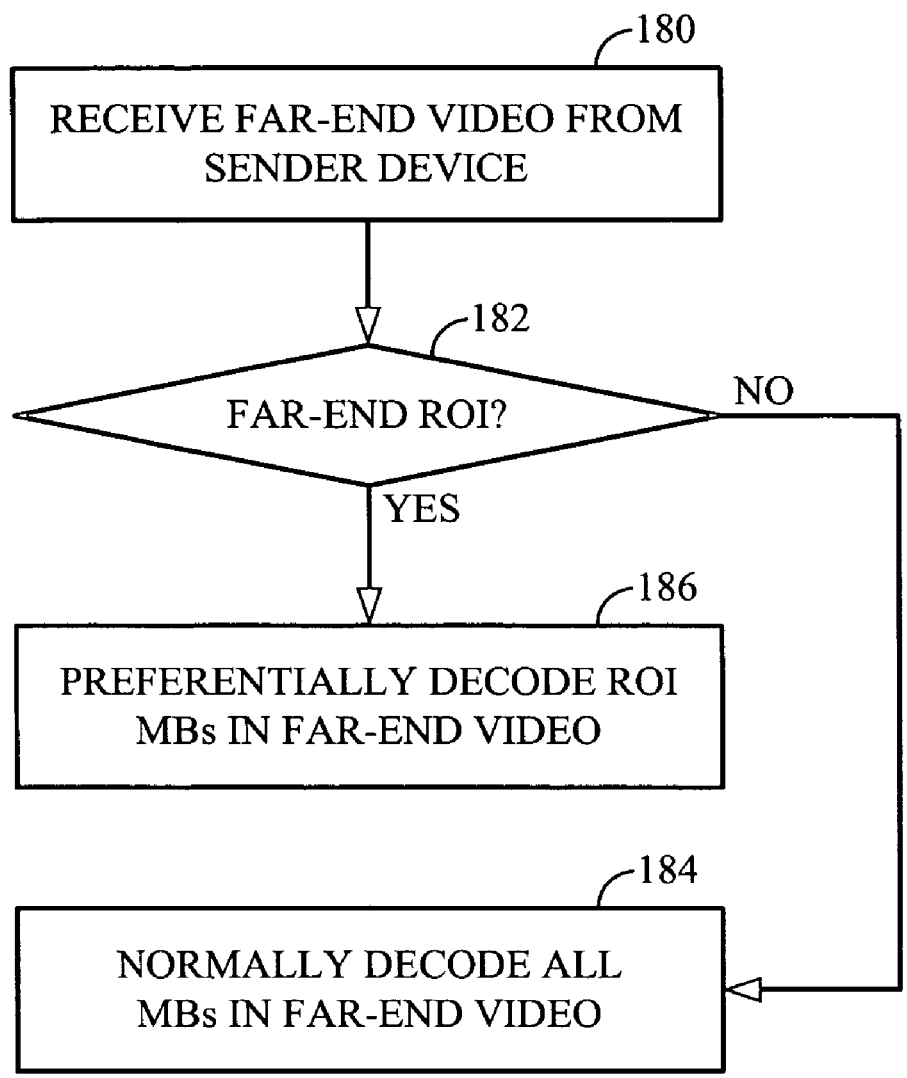
FIG. 19 is a flow diagram illustrating preferential decoding of ROI macroblocks within far-end video.

FIG. 19 is a flow diagram illustrating preferential decoding of ROI macroblocks within far-end video. As shown in FIG. 19, upon receipt of far-end video from a remote sender device 14 (180), ROI-aware video decoder 48 in local recipient device 12 determines whether far-end ROI has been specified by the local user (182). If not, ROI-aware video decoder 48 normally encodes all MBs in the far-end video (184). If far-end ROI information is specified by the local user, however, ROI-aware video decoder 48 preferentially decodes ROI MBs in the received far-end video (186). The ROI MBs may be preferentially decoded by applying higher quality interpolation equations or more robust error concealment techniques, relative to the interpolation equations and error concealment techniques applied to the non-ROI MBs. Preferential decoding may include preferential post-processing such as higher quality deblocking or deringing filters.

The techniques described herein may be implemented in hardware, software, firmware, or any combination thereof. If implemented in software, the techniques may be realized in part by a computer readable medium comprising program code containing instructions that, when executed, performs one or more of the methods described above. In this case, the computer readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like.

The program code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. In some embodiments, the functionality described herein may be provided within dedicated software modules or hardware units configured for encoding and decoding, or incorporated in a combined video encoder-decoder (CODEC).

Various embodiments have been described. These and other embodiments are within the scope of the following claims.

The invention claimed is:

1. A method comprising:
    receiving, by a local device, encoded far-end video sent from a remote device, the local device and the remote device each comprising a video communication device, wherein the far-end video is captured by the remote device;
    receiving, by the local device, information from the remote device specifying a region of interest (ROI) within near-end video captured by the local device, wherein the information specifying the ROI is embedded within the encoded far-end video; and
    encoding by the local device, the near-end video based on the ROI to enhance an image quality of the ROI relative to non-ROI areas of the encoded near-end video.

2. The method of claim 1, further comprising transmitting the encoded near-end video with the enhanced image quality to the remote device.

3. The method of claim 1, wherein the information specifying the ROI is included within a user data field that is embedded within the encoded far-end video.

4. The method of claim 1, wherein the information specifying the ROI is embedded within the encoded far-end video by using data hiding technique.

5. The method of claim 1, further comprising:
    decoding the encoded far-end video received from the remote device;
    generating information specifying a far-end ROI within the decoded far-end video; and
    transmitting the information specifying the far-end ROI with the encoded near-end video to the remote device.

6. The method of claim 5, further comprising:
    receiving, by the local device, additional far-end video encoded by the remote device, wherein the additional far-end video is captured by the remote device; and
    decoding the additional far-end video received from the remote device to enhance the image quality of the far-end ROI of the additional far-end video relative to non-ROI areas of the additional far-end video.

7. The method of claim 6, wherein decoding the additional far-end video includes applying higher quality post-processing or error concealment techniques to the far-end ROI of the additional far-end video relative to non-ROI areas of the additional far-end video.

8. The method of claim 1, further comprising generating a macroblock (MB) map identifying MBs that are within the ROI based on the information specifying the ROI.

9. The method of claim 1, wherein encoding the near-end video includes applying higher quality encoding or error protection techniques to the ROI in the encoded near-end video relative to non-ROI areas of the encoded near-end video.

10. The method of claim 1, further comprising authenticating a remote user associated with the remote device before encoding the near-end video based on the ROI.

11. The method of claim 10, wherein authenticating includes determining whether the remote user is authorized to control encoding of the near-end video based on the ROI.

12. The method of claim 10, wherein authenticating includes seeking, from a local user associated with the local device, authorization for the remote user to control encoding of the near-end video based on the ROI.

13. The method of claim 1, wherein receiving information from the remote device includes receiving information from a plurality of remote devices specifying multiple ROIs within the near-end video, the method further comprising authenticating remote users associated with the remote devices to select one of the remote users to control encoding of the near-end video based on the respective ROI.

14. The method of claim 1, further comprising:
monitoring motion information associated with the encoded near-end video;
adjusting the ROI based on the motion information; and
encoding additional near-end video based on the adjusted ROI.

15. The method of claim 14, further comprising generating a macroblock (MB) map identifying MBs that are within the ROI based on the information specifying the ROI, and wherein adjusting the ROI includes modifying status of MBs as being included in or excluded from the ROI based on the motion information.

16. The method of claim 1, wherein the information specifying an ROI includes textual or verbal information, the method further comprising defining the ROI based on the textual or verbal information.

17. The method of claim 16, wherein defining the ROI includes defining the ROI at an intermediate server in communication with at least one of the local device and the remote device.

18. A video communication device comprising:
a video decoder that receives information from a remote video communication device specifying a region of interest (ROI) within near-end video captured by the video communication device, and that further receives encoded far-end video sent from the remote device, wherein the information specifying the ROI is embedded within the encoded far-end video, and wherein the far-end video is captured by the remote video communication device; and
a video encoder that encodes the near-end video based on the ROI to enhance an image quality of the ROI relative to non-ROI areas of the encoded near-end video.

19. The device of claim 18, wherein the video encoder transmits the encoded near-end video with the enhanced image quality to the remote device.

20. The device of claim 19, wherein the information specifying the ROI is included within a user data field that is embedded within the encoded far-end video.

21. The device of claim 18, wherein the information specifying the ROI is embedded within the encoded far-end video by using data hiding technique.

22. The device of claim 18, wherein the video decoder decodes the encoded far-end video received from the remote device, wherein the device further comprises a region of interest (ROI) engine that generates information specifying a far-end ROI within the decoded far-end video, and wherein the video encoder transmits the information specifying the far-end ROI with the encoded near-end video to the remote device.

23. The device of claim 22, wherein the video decoder receives additional far-end video encoded by the remote device, wherein the additional far-end video is captured by the remote device, and wherein the video decoder decodes the additional far-end video received from the remote device to enhance the image quality of the far-end ROI of the additional far-end video relative to non-ROI areas of the additional far-end video.

24. The device of claim 23, wherein the video decoder applies higher quality post-processing or error concealment techniques to the far-end ROI of the additional far-end video relative to non-ROI areas of the additional far-end video.

25. The device of claim 18, further comprising an ROI mapper module that generates a macroblock (MB) map identifying MBs that are within the ROI based on the information specifying the ROI, and an ROI controller that processes the information specifying the ROI for application to the ROI mapper module.

26. The device of claim 18, wherein the video encoder applies higher quality encoding or error protection techniques to the ROI in the encoded near-end video relative to non-ROI areas of the encoded near-end video.

27. The device of claim 18, further comprising an authentication module that authenticates a remote user associated with the remote device before the near-end video is encoded based on the ROI, wherein the authentication module determines whether the remote user is authorized to control encoding of the near-end video based on the ROI.

28. The device of claim 27, wherein the authentication module seeks, from a local user associated with the device, authorization for the remote user to control encoding of the near-end video based on the ROI.

29. The device of claim 18, wherein the information received from the remote device includes information from a plurality of remote devices specifying multiple ROIs within the near-end video, the system further comprising an authentication module that authenticates remote users associated with the remote devices to select one of the remote users to control encoding of the near-end video based on the respective ROI.

30. The device of claim 18, further comprising a tracking module that monitors motion information associated with the near-end video, and adjusts the ROI based on the motion information, wherein the encoder encodes additional near-end video based on the adjusted ROI.

31. The device of claim 30, further comprising an ROI mapper module that generates a macroblock (MB) map identifying MBs that are within the ROI based on the information specifying the ROI, wherein adjustment of the ROI by the tracking module includes modification of status of MBs as being included in or excluded from the ROI based on the motion information.

32. The device of claim 18, wherein the information specifying an ROI includes textual or verbal information, the system further comprising an extraction module that defines the ROI based on the textual or verbal information.

33. The device of claim 18, wherein the information specifying an ROI includes textual or verbal information, the system further comprising an intermediate extraction server, situated remotely from the video communication device and the remote video communication device, that defines the ROI based on the textual or verbal information.

34. A computer-readable medium storing instructions to cause a processor to:
receive, by a local device, encoded far-end video sent from a remote device, wherein the far-end video is captured by the remote device;
receive information from the remote device specifying a region of interest (ROI) within near-end video captured by the local device, wherein the information specifying the ROI is embedded within the encoded far-end video; and
encode the near-end video to enhance an image quality of the ROI relative to non-ROI areas of the encoded near-end video.

35. The computer-readable medium of claim 34, wherein the instructions cause the processor to transmit the encoded near-end video with the enhanced image quality to the remote device.

36. The computer-readable medium of claim 34, wherein the information specifying the ROI is included within a user data field that is embedded within the encoded far-end video.

37. The computer-readable medium of claim 34, wherein the information specifying the ROI is embedded within the encoded far-end video by using data hiding technique.

38. The computer-readable medium of claim 34, wherein the instructions cause the processor to decode the encoded far-end video received from the remote device, generate information specifying a far-end ROI within the decoded far-end video, and transmit the information specifying the far-end ROI with the encoded near-end video to the remote device.

39. The computer-readable medium of claim 38, wherein the instructions cause the processor to receive additional far-end video captured and encoded by the remote device and to decode the additional far-end video received from the remote device to enhance the image quality of the far-end ROI of the additional far-end video relative to non-ROI areas of the additional far-end video.

40. The computer-readable medium of claim 39, wherein the instructions cause the processor to decode the additional far-end video by applying higher quality post-processing or error concealment techniques to the far-end ROI of the additional far-end video relative to non-ROI areas of the additional far-end video.

41. The computer-readable medium of claim 34, wherein the information specifying the ROI includes a macroblock (MB) map identifying MBs that are within the ROI.

42. The computer-readable medium of claim 34, wherein the instructions cause the processor to encode the near-end video by applying higher quality encoding or error protection techniques to the ROI in the encoded near-end video relative to non-ROI areas of the encoded near-end video.

43. The computer-readable medium of claim 34, wherein the instructions cause the processor to determine whether the remote user is authorized to control encoding of the near-end video based on the ROI before encoding the near-end video based on the ROI, and wherein the instructions cause the processor to seek, from a local user associated with the local device, authorization for the remote user to control encoding of the near-end video based on the ROI.

44. The computer-readable medium of claim 34, wherein the information is received from a plurality of remote devices specifying multiple ROIs within the near-end video, and the instructions cause the processor to authenticate remote users associated with the remote devices to select one of the remote users to control encoding of the near-end video based on the respective ROI.

45. The computer-readable medium of claim 34, wherein the instructions cause the processor to:
monitor motion information associated with the encoded near-end video;
adjust the ROI based on the motion information; and
encode additional near-end video based on the adjusted ROI.

46. The computer-readable medium of claim 45, wherein the information specifying the ROI includes a macroblock (MB) map identifying MBs that are within the ROI, and the instructions cause the processor to adjust the ROI includes modifying status of MBs as being included in or excluded from the ROI based on the motion information.

47. A method comprising:
generating information specifying a region of interest (ROI) within far-end video encoded by a remote device and received by a local device, the local device and the remote device each comprising a video communication device, wherein the far-end video is captured by the remote device;
transmitting near-end video, encoded by the local device, from the local device to the remote device, wherein the near-end video is captured by the local device; and
transmitting the information specifying the ROI from the local device to the remote device for use by the remote device in encoding additional far-end video based on the ROI to enhance image quality of the ROI relative to non-ROI areas of the additional far-end video, wherein the information specifying the ROI is embedded within the encoded near-end video.

48. The method of claim 47, wherein the information specifying the ROI is included within a user data field that is embedded within the encoded far-end video.

49. The method of claim 47, wherein the information specifying the ROI is embedded within the encoded far-end video by using data hiding technique.

50. The method of claim 47, wherein the information specifying the ROI includes a macroblock (MB) map identifying MBs that are within the ROI.

51. A video communication device comprising:
a region of interest (ROI) engine that generates information specifying a region of interest (ROI) within far-end video encoded and captured by a remote device; and
a video encoder that encodes near-end video, transmits the encoded near-end video to the remote device, and transmits the information specifying the ROI embedded within the encoded near-end video to the remote device for use by the remote device in encoding additional far-end video based on the ROI to enhance image quality of the ROI relative to non-ROI areas of the additional far-end video, wherein the near-end video is captured by the video communication device.

52. The device of claim 51, wherein the information specifying the ROI is included within a user data field that is embedded within the encoded far-end video.

53. The device of claim 51, wherein the information specifying the ROI is embedded within the encoded far-end video by using data hiding technique.

54. The device of claim 51, wherein the information specifying the ROI includes a macroblock (MB) map identifying MBs that are within the ROI.

* * * * *